United States Patent
Uszok et al.

(10) Patent No.: US 7,861,252 B2
(45) Date of Patent: Dec. 28, 2010

(54) INTELLIGENT SOFTWARE AGENT SYSTEM ARCHITECTURE

(76) Inventors: Andrzej Uszok, ul. Mikolowska 185, 43-187 Orzesze (PL); Pawel Kunstman, ul. Lea 151, 30-133 Krakow (PL)

(*) Notice: Subject to any disclaimer, the term of this patent is extended or adjusted under 35 U.S.C. 154(b) by 2070 days.

(21) Appl. No.: 09/814,846

(22) Filed: Mar. 21, 2001

(65) Prior Publication Data
US 2004/0205772 A1  Oct. 14, 2004

(51) Int. Cl.
G06F 9/44 (2006.01)
G06F 9/54 (2006.01)

(52) U.S. Cl. ...................... 719/317; 709/202

(58) Field of Classification Search .............. 719/317, 719/318; 709/202, 223
See application file for complete search history.

(56) References Cited

U.S. PATENT DOCUMENTS

| | | | |
|---|---|---|---|
| 5,809,492 A | 9/1998 | Murray et al. | 706/45 |
| 6,061,721 A * | 5/2000 | Ismael et al. | 709/223 |
| 6,144,989 A | 11/2000 | Hodjat et al. | 709/202 |
| 6,163,794 A * | 12/2000 | Lange et al. | 709/202 |
| 6,202,062 B1 | 3/2001 | Cameron et al. | 707/3 |
| 6,434,595 B1* | 8/2002 | Suzuki et al. | 709/202 |
| 6,466,974 B1* | 10/2002 | Nelson et al. | 709/223 |
| 6,473,761 B1* | 10/2002 | Shigemori et al. | 707/100 |
| 6,519,653 B1* | 2/2003 | Glass | 719/317 |
| 6,539,416 B1* | 3/2003 | Takewaki et al. | 709/202 |
| 6,785,721 B1* | 8/2004 | Immerman et al. | 709/220 |
| 6,862,619 B1* | 3/2005 | Sugauchi et al. | 709/224 |
| 7,036,128 B1* | 4/2006 | Julia et al. | 719/317 |
| 7,107,536 B1* | 9/2006 | Dowling | 715/738 |
| 2001/0029526 A1* | 10/2001 | Yokoyama et al. | 709/218 |

FOREIGN PATENT DOCUMENTS

| | | |
|---|---|---|
| EP | 0862113 A2 | 9/1998 |
| WO | WO 97/26612 | 7/1997 |
| WO | WO 98/21662 | 5/1998 |

(Continued)

OTHER PUBLICATIONS

Fabio Bellifemine, Agostino Poggi and Giovanni Rimassa, "Developing multi-agent systems with a FIPA-compliant agent framework", Software—Practice & Experience, vol. 31, Issue 2, Feb. 2001, pp. 103-128.*

(Continued)

*Primary Examiner*—Li B Zhen
(74) *Attorney, Agent, or Firm*—Jellett IP Law PS

(57) ABSTRACT

A software architecture supports deployment of mobile software agents over the Internet. Mobile software agents or "bots" are bifurcated into two parts, a first part executable on a user's client platform ("mBot"), and a corresponding second part, called "sBot," executable on a remote "bot server". botServer implements virtual "meeting places" for visiting bots, and provides event notification, plug-ins and other services. The new system further includes a component called "botBox" executable on another server (which may be the same as the bot server), that tracks the status and locations of running bots, handles communications, and enables continuing operation while the user is off-line. Knowledge about the user, including private information, is finely controlled by custom user profiles which are defined by the user, but made available to the remote-executing sBot only through the botBox intermediary.

29 Claims, 22 Drawing Sheets

FOREIGN PATENT DOCUMENTS

| | | |
|---|---|---|
| WO | WO 98/21863 | 5/1998 |
| WO | WO 00/19316 | 4/2000 |
| WO | WO 00/45628 | 8/2000 |
| WO | WO 00/55726 | 9/2000 |
| WO | WO 00/58880 | 10/2000 |
| WO | WO 00/72199 A2 | 11/2000 |
| WO | WO 01/02952 A2 | 1/2001 |

OTHER PUBLICATIONS

"Agent Construction Tools," published by Agent Building on Feb. 5, 2001 on the Internet at http://www.agentbuilder.com/AgentTools/.

"All About Directory Services," published by ITworld.com on the Internet at itworld.com/cma/ett_content_article/0,2849,1_871,00.hmtl, Dec. 31, 2000.

"An Agent-Based Intelligent Distributed Information Management System for Internet Resources," by Stuart Soltysiak, et al., published on the Internet at isoc.org/inet2000/cdproceedings/2f/2f_1.htm, Feb. 23, 2001.

"An Approach to Using XML and a Rule-Based Content Language with an Agent Communication Language," by Benjamin N. Grosof, published on Mar. 15, 1999 by IJCAI-99, Workshop on Agent Communication Languages, on the Internet at win.tue.nl/ac199/labrouabstr.

"An Extensible Approach for Modeling Ontologies in RDF(s)" by Steffen Staab, et al., published by Oasisopen.org on the Interne at citeseer.nj.nec.com/376601.html, ECDL 2000 Workshop.

"BotBox—Monitor, Retrieve and Filter Information," published by BotBox AB on the Internet at botbox.com/botboxagents.html, 1 page, retrieved Feb. 14, 2001.

"BotBox—A New Generation of Tools," published by BotBox AB on the Internet at botbox.com, 1 page, retrieved Feb. 14, 2001.

"BotBox—Background; Internet Promises," published by BotBox AB on the Internet at botbox.com/promises.html, 1 page, retrieved Feb. 14, 2001.

"BotSpot Home Page," published by internet.com on the Internet at botspot.com, 3 pages, retrieved Feb. 27, 2001.

"Bot News BotBox," by Brian Proffitt, published by internet.com on the Internet at botspot.com/news/newbots012201-1.html, 2 pages, copyright 2001.

"Bot2001 Report: Where Can I Put my Bot?" Published by internet.com on the Internet at botspot.com/news/news020501.html, 3 pages, copyright 2001.

"BotSpot News and Reviews: Learn the Strategies in Using Bots in Your Everyday Business," published by internet.com on the Internet at botspot.com/news/index.htm, 4 pages, copyright 1999-2000.

"Directory Management," by Sami Lais, published by ITworld.com on Mar. 13, 2000 on the Internet at itworld.com/cma/ett_content_article/0,2849,2007_2006,00.html.

"Intelligent Mobile Agents," published by TNET: Executive Summary on the Internet at cs.tcd.ie/research_groups/aig/iag/pubreview/chap5/chap5/html, 12 pages, retrieved Jan. 2, 2001.

"International Conference on Artificial Intelligence and Law (Proceedings of the Seventh International Conference on Artificial Intelligence and Law)," by James Osborn, et al., published by ACM Digital Library on Jun. 14, 1999 on the Internet at acm.org/pubs/citations/proceedings/ai/323706/p173-osborn/.

"International Conference on Autonomous Agents (Proceedings of the Fourth International Conference on Autonomous Agents)," by Olivier Gutknecht, et al., published on Jun. 3, 2000 by ACM Digital Library on the Internet at acm.org/pubs.citations/proceedings/ai/336595/p78-gutknecht/.

"LDAP Data Interchange Format," published by whatis.com on the Internet at whatis.techtarget.com/WhatIs_Definition_Page/0,4152,214619,00.html, 2 pages, Dec. 31, 2000.

"LDAP in Action, Part 1," by Rawn Shah, published in Jul. 1999, by ITworld.com on the Internet at linuxworld.com/linuxworld/lw-1999-07/lw-07-ldap_1_p.html.

"Ontology Engineering Beyond the Modeling of Congress and Relations," by Seffen Staab, et al., published by s.staab on the Internet at citeseer.nj.nec.com/staab00ontology.html, 3 pages, 2000.

"Simple Object Access Protocol (SOAP) 1.1." published on May 8, 2000 by W3C on the Internet at w3.org/TR/SOAP/.

"Software Agents Using XML for Telecom Service Modeling: A Practical Experience," by Christophe Vermeulen, published on May 1998 by Alcatel Telecom on the Internet at infoloom.com/gcaconfs/WEB/paris98/bauwens.HTM.

"What .NET Means for Users and Developers," published by microsoft.net on the Internet at microsoft.com/net/developer/developers.asp, 27 pages, copyright 2000.

"FIPA Abstract Architecture Specification," published on Nov. 10, 2000 by the Foundation for Intelligent Physical Agents.

"FIPA Abstract Architecture Specification," published on Oct. 19, 2000 by the Foundation for Intelligent Physical Agents.

"FIPA Nomadic Application Support," published on Jul. 27, 2000 by the Foundation for Intelligent Physical Agents.

"Mobile Agent Computing," published on Jan. 19, 1998 by Mitsubishi Electric ITA.

"A Perspective on Software Agents Research," by Hyacinth S. Nwana, et al., published by the British Telecommunications Laboratories, 16 pages, 1999.

"Share the Ontology in XML-Based Trading Architectures," by Howard Smith, et al.. published in Mar. 1999, by Communications of the ACM.

"Technology at a Glance—Concordia—Java Mobile Agent Technology," published by Mitsubishi Electric ITA, 8 pages, copyright 1997.

"UDDI Executive White Paper," published on Sep. 6, 2000 by Ariba, Inc., IBM and Microsoft.

"Agent-Based Software Engineering (Agent-Oriented Software Engineering, Lecture Notes in AI)," by Charles Petrie, published by Stanford Networking Research Center on the Internet at stanford.edu/˜petrie/agents/abse/abse.html, 17 pages, 2001.

International Search Report for PCT Application No. PCT/US01/09081 dated Oct. 15, 2001.

Chess, David, et al., "Itinerant Agents for Mobile Computing" *IEEE Personal Communications*, IEEE Communications Society, U.S., vol. 2, No. 5, Oct. 1995, pp. 34-49.

Fünfrocken, Stefan, "An Infrastructure for Web-Agent-Based Service Providing," Technical Report TR-VS-97-01, Department of Computer Science, Darmstadt University of Technology, 1997, pp. 1-10.

Kovacs, Ernö, et al., "Adaptive Mobile Access to Context-Aware Services," International Symposium on Agent Systems and Applications, International Symposium on Mobile Agents, Oct. 3, 1999, pp. 190-201.

Pastor, Jon A., et al., "An Architecture for Intelligent Resource Agents," Proceedings of the IFCIS International Conference on Cooperative Information Systems, Coopis, Jun. 24, 1997, pp. 151-159.

Van Der Merwe, Jaco, et al., "Electronic Commerce with Secure Intelligent Trade Agents," *Computers and Security*, vol. 17, No. 5, Elsevier Science Publishers, Amsterdam, pp. 435-446, 1998.

\* cited by examiner

Agent Communication and Semantics
(ACL, Encodings, Interaction Protocols, etc.)

Abstract Architecture
(Naming, Transport, Encoding, Namespace)

Concrete Elements
(Gateways, Services, Agent Platform)

Set 1

Set 2

Actual Implementation 1

Actual Implementation 2

Figure 1
(prior art)

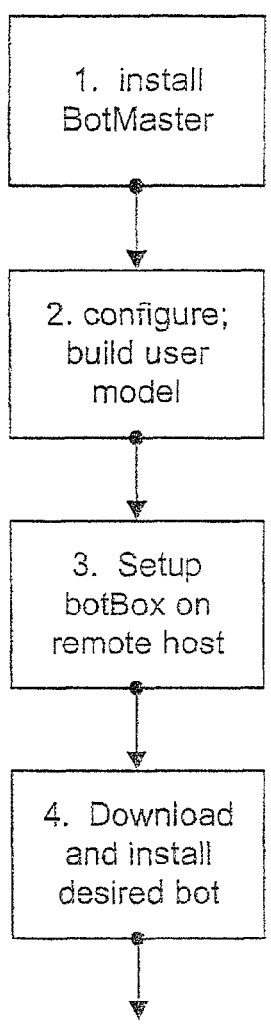
Figure 8-A
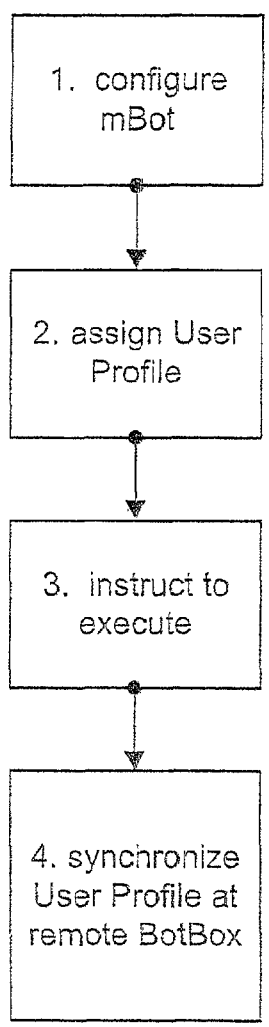
Figure 8-B
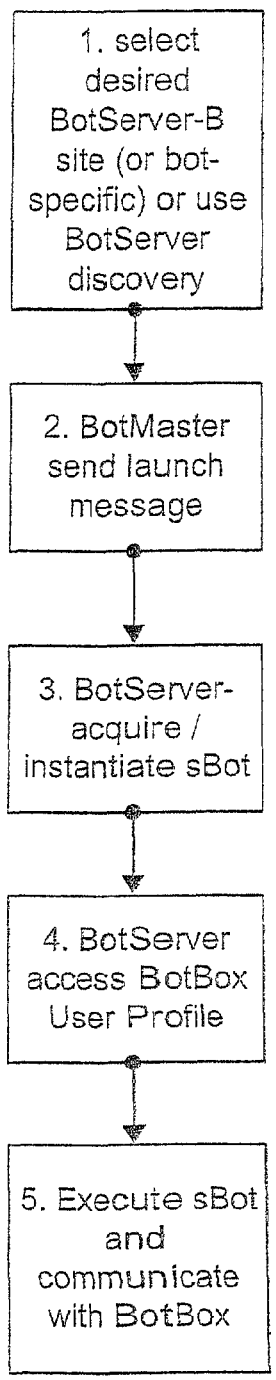
Figure 8-C

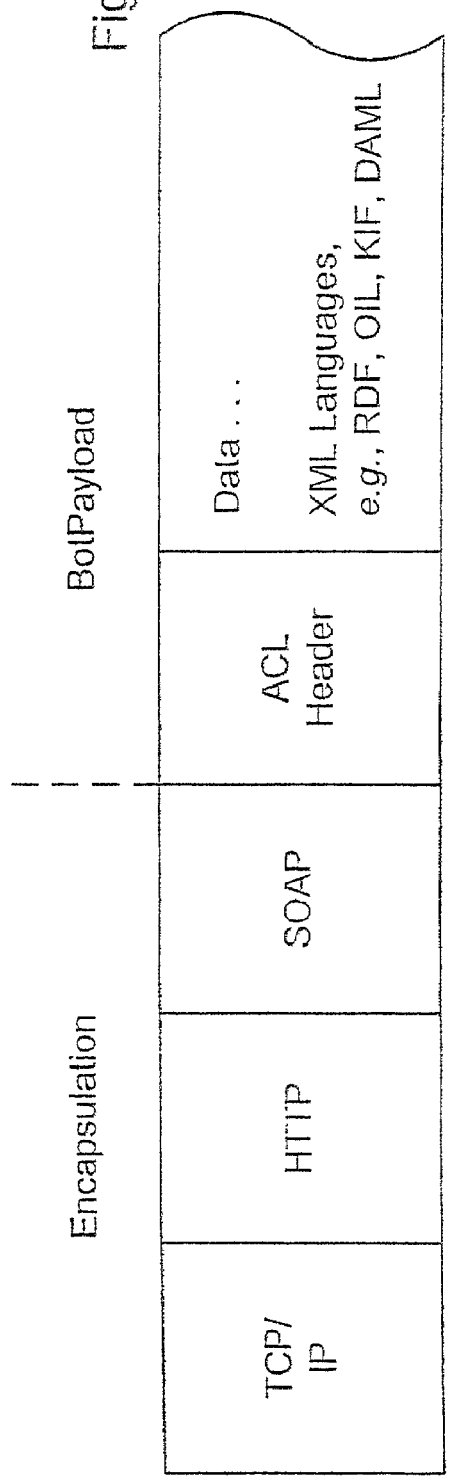
Figure 10-A
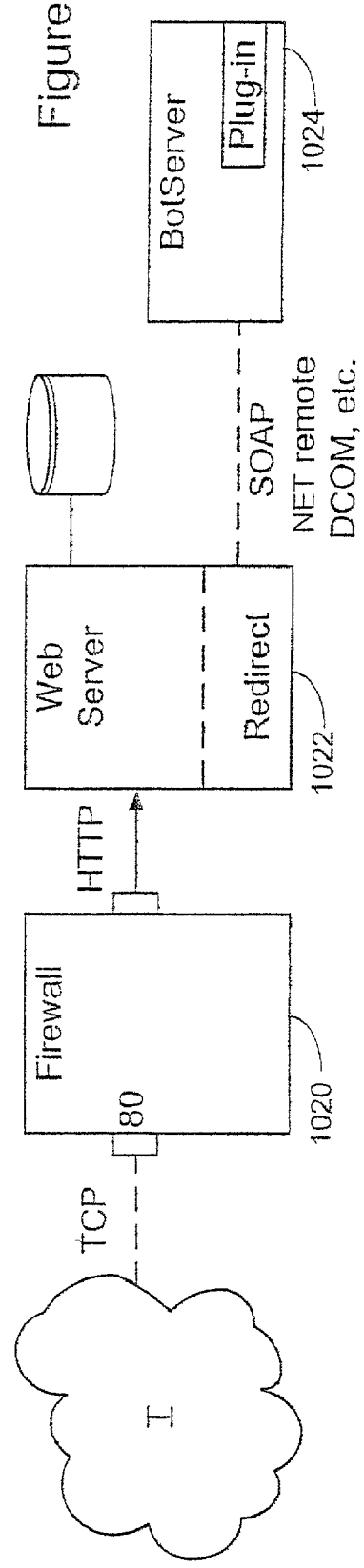
Figure 10-B

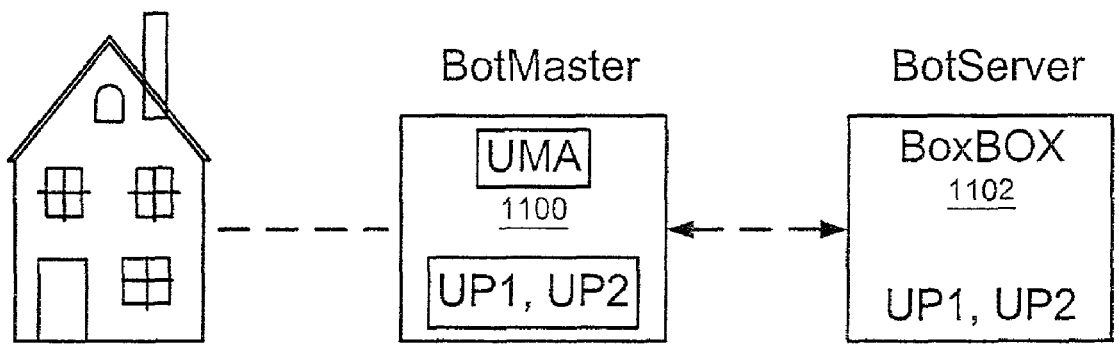
Figure 11-A
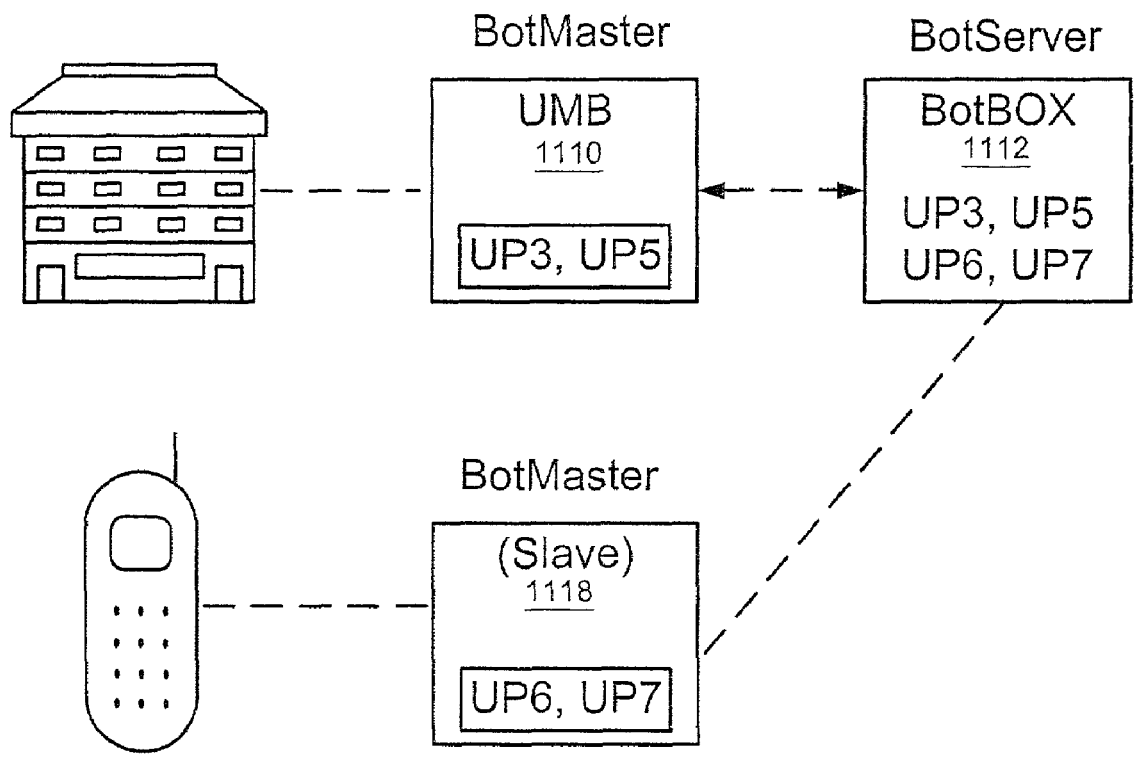
Figure 11-B

INTELLIGENT SOFTWARE AGENT SYSTEM ARCHITECTURE

COPYRIGHT NOTICE

©Bot, Inc. 2001. No claim is made in prior art drawing FIGS. 1 and 2. "A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever." 37 CFR 1.71(e).

TECHNICAL FIELD

This invention pertains to intelligent software agents and, more specifically, is directed to a system architecture and methodologies to support ubiquitous deployment and execution of software agents or "bots" over the Internet.

BACKGROUND OF THE INVENTION

Intelligent, autonomous software agents—long the stuff of science fiction—are fast becoming a practical reality. Although software's ability to reason, generally known as artificial intelligence, is still limited, there are useful applications. Most of these applications, however, are very specific and "hand coded" for execution on particular computing platforms, using well-defined data presented in well-defined formats. We do not yet have a generic software agent that can work effectively with all types of information or "knowledge" on any platform where that knowledge might be found. To find particular resources on the Internet today, most applications use search tools or "engines" that are relatively crude. They index textual content, basic metadata, or both. The search result is often a great many "hits" only a few of which are actually useful; they must be filtered manually. The reason is that "knowledge" is a much richer, and more complex, paradigm than simple tags or key words taken out of context. What is needed is a bot system architecture that will support deployment of more intelligent agents and allow them to more effectively operate on or exchange knowledge without limiting them to any specific platform or protocol.

Another growing problem in computing generally and on the Internet in particular is privacy. Personal information about a user is necessary for many applications. For example, knowledge of a user's automobile is needed to register (or perhaps sell) the car "on-line." Grades and test scores are essential to college applications. Medical history is not appropriate to purchasing theatre tickets. The present invention provides for fine-grained control over privacy, exposing appropriate information as needed, while maintaining secure control over all user data. Improved functionality can be achieved if the user can assert and maintain control over what types of personal information, including identity, are exposed to what types of recipients. Implementing and securely enforcing these kinds of controls requires a new architecture that enables mobile, intelligent software agents to act autonomously on behalf of the user.

Another problem is the need to send or receive digital messages, or take other actions, at times that are inconvenient for the user or when the user is off-line. E-mail "store and forward," voice messaging mailboxes and the like are known, but they have limited capabilities. Voice messages must be manually retrieved, and neither their subject matter nor level of importance can be determined without the recipient actually listening to the message. E-mail handling requires the user to set up forwarding rules or policies each time forwarding is invoked. Some routing can be done by recognizing a key word in a header, but this approach is awkward and unreliable. What is needed is a convenient way to apply some (artificial) intelligence to handling the user's communications, regardless of whether the user is actually available or on-line at the time. An intelligent software agent, acting on behalf of a user, could make reasoned decisions about routing, storing, blocking or forwarding communications, given a meaningful "profile" of the user. Even more powerful, the software agent could "learn" about the sender of a message, if necessary, to decide how to handle it. All of this could be done while the user is off-line. These features are supported by the bot system architecture of the present invention.

The Foundation for Intelligent Physical Agents (FIPA) is an international organization dedicated to promoting the industry of intelligent bots by openly developing specifications supporting interoperability among agents. Through open collaboration among its member organizations, FIPA has developed a series of specifications including, in particular, the FIPA Abstract Architecture Specification, published in 2000. FIPA provides suggested specifications for agent infrastructure and agent applications. The infrastructure specifications include an agent communication language (ACL), agent services and supporting management ontologies. The primary purpose of the abstract architecture is to identify the elements of the architecture that must be codified. Specifically, if two or more systems use different technologies, it is necessary to identify the common characteristics of the various approaches. This leads to the identification of architectural abstractions: abstract designs that can be formally related to every valid implementation.

The present invention, in many aspects, is consistent with the FIPA abstract architecture. What the present invention provides that FIPA does not is a concrete realization or a practical, workable system. The FIPA abstract architecture provides general descriptions of agents, agent services and agent messaging elements for interoperability. FIG. 1, borrowed from the FIPA abstract architecture document, illustrates the hierarchical relationships between the abstraction defined by FIPA and the elements of a specific instantiation.

FIG. 2 is a block diagram of a prior art mobile agent architecture described in *Mobile Agent Computing—A White Paper* (Mitsubishi Electric ITA Jan. 19, 1998). That system relies on literally transporting an agent (program) from one site or network node to another, based on a predetermined "itinerary." The agent initiates the transfer by invoking certain (Java) methods on the server. This signals the server to suspend execution of the agent and to create a persistent image of it to be transferred. The server then inspects an itinerary object, created and owned by the agent, to determine the appropriate destination. That destination is contacted and the agent's image is transferred, where it is again stored persistently before being acknowledged, and then queued for execution on the destination server. Accordingly, the agent's itinerary must be determined by the agent programmer before deployment. The agent cannot make autonomous decisions about travel to new sites in the Mitsubishi system. And the transfer of entire agent applications occupies network bandwidth, thereby eroding performance. The need remains for a mobile agent architecture that is far more flexible to allow agents to operate autonomously and reproduce or migrate as they may determine appropriate to their assigned task.

SUMMARY OF THE INVENTION

The present invention is directed to a system architecture for creating and deploying intelligent software agents or "bots" to carry out a wide variety of personal and business objectives. Based on the system presented here, software agents will figuratively "travel" around the Internet, visiting one or more hospitable sites called "botServers" where they can execute selected logic, interact with other programs including other bots, exchange knowledge and ultimately return (or return results) to their owner. Bots will be able to interact with other bots to leverage information heretofore confined within vertical constraints.

One key element of the system is the "botServer," capable of running visiting bots and providing them additional data and services. The botServer can be configured in such a way that bot activity is performed via the botServer extended interfaces. Preferably, the botServer implements a "sandbox model" for bot execution. The botServer itself can provide a suite of standard services, such as, for example, itinerant bot information/bot location, bot lifetime/mobility management, networking, ontology/knowledge management, payment services for purchase transactions or bot usage, persistency, etc.

Additional services can be implemented by the botServer owner (typically a company), such as access to company databases, external systems, or special bot services (designed for use by specialized bots). To illustrate, an automobile manufacturer might deploy a botServer to receive auto repair service bots and keep them apprised of technical information. The same auto manufacturer might deploy another botServer to host OEM parts vendor bots. The vendor bots could inquire into the manufacturer's inventories and assembly schedules to ensure delivery of needed parts on time. In this way, the supply chain adapts to changing demand in real time without human intervention.

The botServer system is open to allow creating services targeted to very narrow classes of bots, but creating standard services available to all bots is easy as well. In a presently preferred embodiment, this feature is provided by a mechanism of plug-ins (extending the bot-available services). A set of standard plug-in interfaces can be defined that should be suitable for most standard usages (e.g., data publishing).

According to another aspect of the invention, a user (or bot owner) manages her bots via the "botMaster," which is typically implemented as an application program executable on the user's PC or other local computing platform. The user, through botMaster, can purchase (or license), configure, deploy, monitor, organize and otherwise control the bots as needed. The botMaster program also gathers the user preferences, data, etc., within user-defined bounds. BotMaster can also be used monitor user actions to build a rich user model, further discussed later. The botMaster thus acts as the execution and support platform for bots and may be used on multiple platforms (e.g., Window desktop, PDA, mobile phone, etc.). While the user's botMaster principally resides on a PC, for example, the user might employ a "thin" botMaster client on a mobile phone for more limited purposes, such as directing the main botMaster to launch selected bots or checking the status of executing bots.

The microbots, or more simply, "bots," are pieces of code, preferably bifurcated into a server part and a corresponding client part, that interact with the botServer and botMaster, respectively, to fulfill their objectives. The client part of an individual bot, called "mBot," for convenience, and its sibling server part, called "sBot," can find and interact with each other over a network such as the Internet. They generally communicate indirectly, however, through an intermediary called a "botBox" account as will be explained. The client side—mBot—implements a presentation layer, active component or even pure XML or HTML, and may have multiple presentations for different platforms. The server side—sBot—implements functional logic.

Bots can be created by a user "from scratch" if desired but, more commonly, they will be created by independent developers using a software development kit (SDK) that includes standard software components such as the interfaces mentioned above. Preferably, each bot is digitally "signed" in order to verify its creator identity, and all the data that it carries can be protected by encryption to assure the user's privacy. The system architecture assures a high level of protection of the user's personal and confidential data by prescribing standardized methods for exposing or passing personal data in the system and also between bots. The user's privacy is protected, as well, through selected "user profiles."

BotBox—generally realized as a program running on botServer—allows bot activity while the bot owner is off-line and queues communications until the user becomes available. It also implements multiple user profiles, allowing the user to assign to a given bot any profile or digital "persona" that the user chooses to expose. BotBox also manages migration of bots from one server to another, keeping track of their status and locations. Additional objects and advantages of this invention will be apparent from the following detailed description of preferred embodiments thereof which proceeds with reference to the accompanying drawings.

BRIEF DESCRIPTION OF THE DRAWINGS

FIG. 1 is FIPA abstract architecture.

FIGS. 8-A through 8-C are flow diagrams illustrating generally the processes of finding, installing and running a mobile software agent.

FIG. 10-A illustrates a sample message format for communication between bots over a network using known protocols.

FIG. 10-B is a simplified block diagram illustrating message delivery from the Internet to a botServer component.

FIG. 11-A illustrates installation of a botMaster on a user's home machine, and installation of a corresponding botBox on a remote botServer "X."

FIG. 11-B illustrates deployment of master and slave botMaster applications sharing a common user model.

DETAILED DESCRIPTION OF PREFERRED EMBODIMENTS

Glossary

Figure 2:
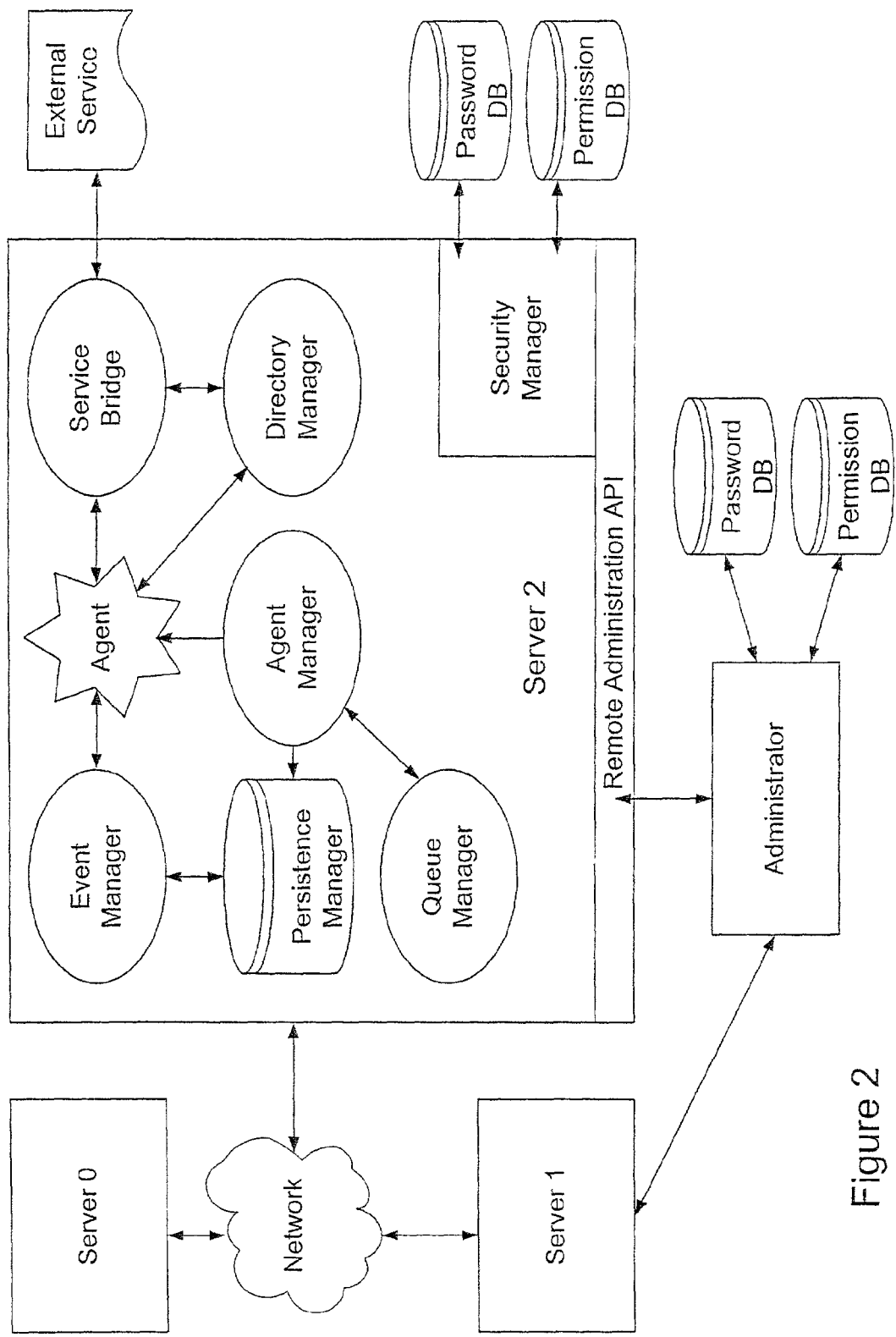
FIG. 2 is a block diagram of a prior art mobile agent architecture.
Figure 3:
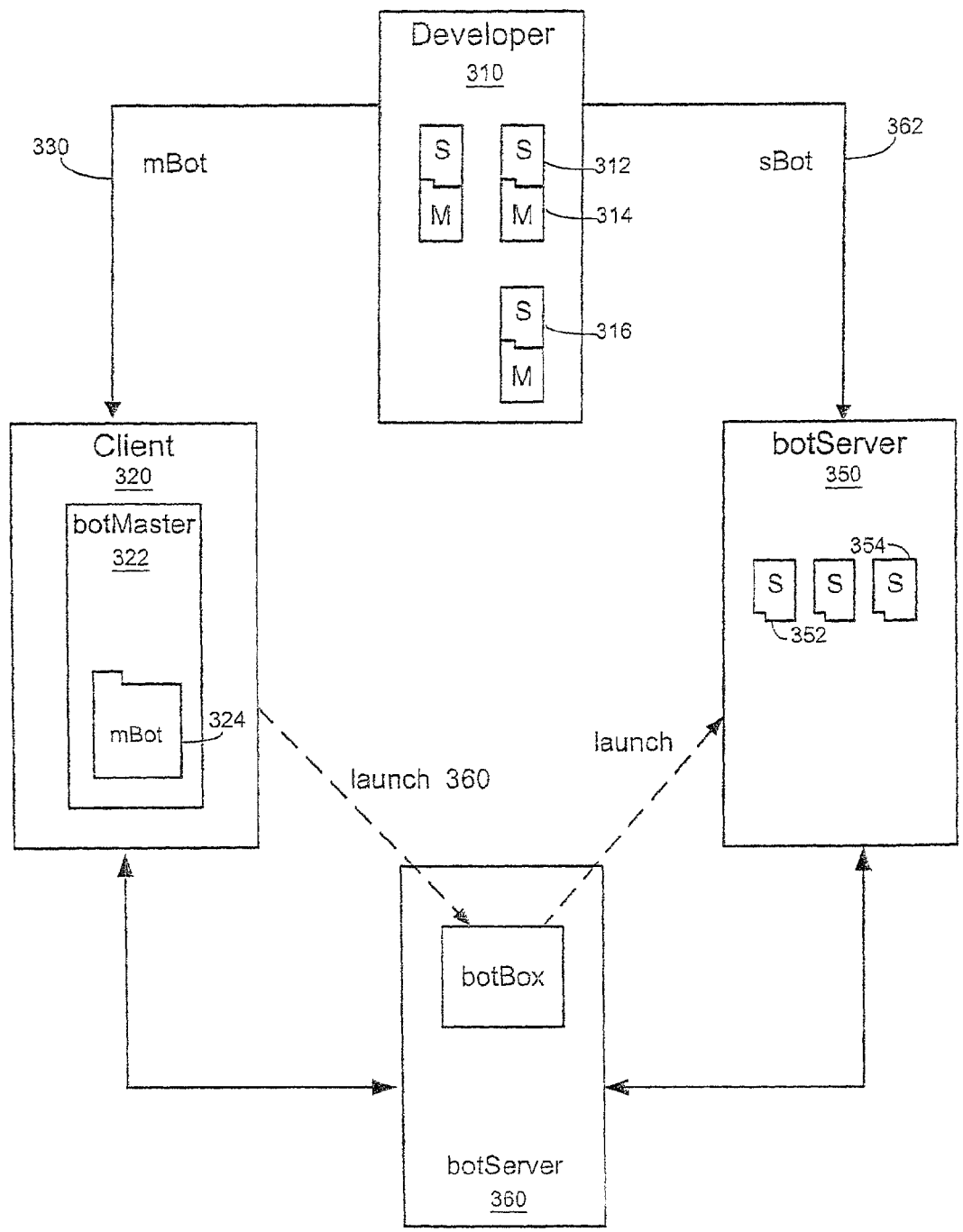
FIG. 3 is a high-level conceptual diagram illustrating certain aspects of the present architecture, including bifurcation of mBots and corresponding sBots.

The following terms, briefly summarized here for the convenience of the reader, are more fully explained in the detailed description below. FIG. 3 of the drawings provides introductory visual orientation to many of the following terms. These short definitions are not intended to be limiting. They are intended to be short and in some cases refer to only one example of the concept.

botMaster: A client application for execution and management of bots. botMaster provides access to various operating system services and desktop applications (via e.g. botMaster plug-ins). It gathers knowledge about the user and provides it to the approved bots. botMaster also provides security mechanisms for protecting the user from malicious bots. The botMaster application communicates with botBox on a botServer.

botServer: A server for hosting many running bots concurrently. botServer provides a safe environment for bot execution; and scales well. It provides access to various server-dependent services via plug-in mechanisms. botServer also hosts botBoxes, and implements a mechanism of "meeting places" for bot interactions and protocol execution.

mBOT: botMaster (client side) version or component of a bot. mBot executes on botMaster and communicates with one or more related sBot(s) if provided. mBot may have special runtime environment requirements, and may request special operating system privileges.

sBOT: botServer (server side) version or component of a bot. sBot participates in various interactions with plug-ins and other bots. It may be programmed to clone and/or migrate. The sBot is not afforded access to potentially harmful operating system services—uses bot platform ("Executor") services instead. An sBot communicates with a sibling mBOT via the botBox. sBOT operates in fully asynchronous, event-driven manner and generally executes in a request-response scenario. sBOT is required to relinquish control to botServer each time it processes it's messages.

botBox: Much like a user account in a bot system. Resides on a selected botServer. Provides a means of communication between botMaster and the user's bots on the same or another botServer. botBox also implements communication queues supporting offline users and multiple botMasters. Participates in bot migration. Keeps track of all of the user's bots. And, botBox protects the user's anonymity by using "user profiles" that shield botBox from bots accessing it directly.

botPassport: BotPassport is typically realized as a set of heterogeneous data attached to each bot instance on the platform (botServer), used to verify the bot's origin, rights assigned to it by the user, user's identification (if necessary), etc. BotPassport should be digitally signed or similar techniques applied to enable verification of its authenticity. The passport is effectively carried by the sBot.

botMANIFEST: Similar in concept to the botPASSPORT, but the manifest carries data on the bot type (or class)—e.g. developer information and certificates, requested permissions, runtime requirements etc. Individual bots are instantiated from the bot type in botServer.

botWALLET: A botServer mechanism for securely providing valuable user data to authorized parties. botWallet can be configured to use standard payment protocols. botWALLET is tightly coupled with botBox and provides bots with means to verify all payment requests (automatically or by interaction with user), create operational billing and provide the requested data in secure way.

Matching Service: A platform service for matching offers and requests with various data published by bots and plug-ins. Matching service can provide bots and plug-ins with sophisticated AI-based matching algorithms operating on ontology-based descriptions. Simple matching such as keywords can be done in a matching service, or more directly by a bot protocol, search plug-in or subscriber service.

Meeting Place: A virtual space on the server, which provides bots with access control, access to specific plug-ins and optionally enforces or at least supports one or more protocols. Meeting places can be used to simplify interactions of bots that have something in common. It may be also used to logically group system resources.

Plug-In: A module installed on botServer or botMaster that provides bots (and optionally other plug-ins) with defined functionality. botServer plug-ins are installed by the system administrator and, unlike bots, plug-ins may have any operating system privileges. Plug-ins interact with the other bots and plug-ins exclusively via the message mechanism. They may participate in various interaction protocols.

Protocol (also called Interaction Protocol): A set of rules describing bot interactions. Specifically, in a presently preferred embodiment, a protocol describes all allowed bot state transitions and formats of data that may be passed among all protocol participants to transform from one state to another. Protocols are used to standardize the bot-bot and bot-plug-in interactions and allow easier support for bot "discussions" and negotiations at a bot meeting place.

Subscriber-Publisher Service (aka event registry, event service): A service provided by a host for publishing and subscribing to various events. For example, a bot can publish information about itself, what it offers or what it is seeking, to make that information known to others (other bots, programs, plug-ins). The bot also can subscribe to receive notification of a selected event. The "event" is very general; it may be, for example, occurrence of a selected time or date, arrival of a new bot, a stock price point, etc. The service broadcasts notification of an event to all bots that subscribed for that event. It can implement a priority scheme applicable when more than one bot registers for the same event. The service preferably provides XMLQuery—compatible services for flexible information queries. Subscriber-publisher services are used by botMaster and by botServer.

User Profile: A user-defined set of data providing the user with one or more identities. User profiles are created and managed by the user on botMaster and each bot deployed by the user acts on behalf of one particular user profile. User Profile enables filtered access to user data on botMaster. On botServer, the user profile acts as the intermediate layer for bot interactions that shields botBox from direct bot access to ensure privacy.

1. Introduction and Overview.

A software "agent" means various things to various people. In general, it can be defined as a program that is somewhat independent or autonomous, yet runs on behalf of a system or network user. Autonomy implies, in part, that the agent can run without the user that launched it remaining on-line. An agent often is "mobile" in the sense that it can execute, or at least cause some execution, on a network node such as a server remote from the machine on which the agent initially began execution. Intelligent software agents, or "bots," implement some ability to reason, some artificial intelligence. One aspect of intelligence is the ability to acquire or exchange knowledge.

A number of formal systems have been proposed for expressing knowledge in forms that are useful for computers to exchange and acquire knowledge. Some of the leading protocols include KIF (Knowledge Interchange Format), which is a draft proposed American National Standard. KIF is a language designed for use in the interchange of knowledge among disparate computer systems. It is not intended as a primary language for interaction with human users, nor is it intended as an internal representation for knowledge within computer systems. Typically, when a computer system reads a knowledge base in KIF, it converts the data into its own internal form. The present invention is directed to a system architecture in which bots can operate, and interoperate, effectively and efficiently. Within this environment, bots can acquire and exchange knowledge using virtually any desired language, metalanguage or ontology.

FIG. 3 is a simplified illustration of a new bot system architecture. Referring to FIG. 3, the bot system comprises four major elements: a bot developer site 310, an end-user or client system 320, a botServer system 350, and a botBox server 360. By "developer site" here we mean a source of bots, e.g., a server from which a desired bot can be acquired. In practice, each of these elements—bot developer site, client system, botServer system and botbox server—is implemented in software on an appropriate digital computing platform. Various platforms can be used, including many of the modern operating systems such as Microsoft Windows, Linux, or Sun OS, etc. In a presently preferred embodiment, the system utilizes Microsoft.Net—a framework for distributed computing over the Internet.

Referring again to FIG. 3, a software developer creates one or more bots, such as bot 316, which can be designed to implement any desired personal or business functionality, as further explained later. (The bot software developer could just as well be the end user or the botServer proprietor, but to facilitate the present description we treat it as a distinct entity. We generally expect bot development—especially for vertical markets—to present a significant opportunity for independent software application developers.)

Importantly, each bot may consist (and usually does) of two or more components, for example, an sBot component 312 and a corresponding mBot component 314. The present invention is not limited, however, to bots having a one-to-one relation between a single mBot and a single sibling sBot. For example, in some applications, one "administrator mBot" might control several utility sBots that provide monitoring services, translate messages, etc. Also, an sBot can clone itself to create a multiple-sBot team, as described later with regard to FIG. 9. For ease of explanation, this description focuses primarily on a one-mBot to one-sBot scenario, although extensions (cloning) to multiple sBots are mentioned later. Each portion of the bot, mBot and sBot, is implemented as a separate executable program designed to communicate and interact with its counterpart. We call this bifurcation of the bot code. The mBot portion executes exclusively on the end user's (client) machine, while the corresponding sBot portion executes on a server platform, hereinafter called a "botServer" (350). To illustrate, botServer is hosting sBots 352 and 354. The two parts of the bot need not necessarily—and frequently do not—execute concurrently. Each sBot and the corresponding (sibling) mBot have knowledge of their sibling common globally unique identifier. The mBot and sBot communicate via the botBox server 360, as explained in detail later.

FIG. 3 further illustrates how bot code can be acquired by a user. As mentioned, the developer creates the two-part bot code, and at least the sBot code is signed with the author's digital signature or other indicia that can later be used to authenticate the source of the sBot code for safety and security reasons. The mBot code may be signed as well. When the user desires to enlist the services of a bot, the user invokes a client-side bot management application program that we call "botMaster" (322). The botMaster program 322 can present various user interfaces as described later. It can operate in a Web browser. The botMaster is used to find and obtain the desired bot. The botMaster program may undertake a search if necessary (via the Internet) to discover an appropriate bot (or bot developer). It then communicates with the developer's system 310 to specify and purchase or license the desired bot, e.g., bot 316. The bot may be leased as well, meaning licensed for a limited period of time. The botMaster program 322 then downloads (link 330) only the mBot portion 324 of Bot 316 to the client machine 320. The mBot program, as mentioned, includes a unique identifier for subsequently linking that mBot to its sibling sBot.

When the user deploys the bot, as further explained later, the botMaster program "sends" the bot to an appropriate botServer 350. The mBot program is not transferred to the server. Rather, a launch message is sent from botMaster to the server (more precisely—to botBox) to launch the corresponding sBot. As illustrated in FIG. 3, the launch request 360 is be sent to the user's botBox, which in turn communicates with the botServer. The communication link 360 shown in FIG. 3 can be established over any convenient digital communication link or network, wired or wireless, and in most instances is conveniently carried out over the Internet on TCP/IP. The same description applies to virtually all inter-platform messaging described in this document. Preferably, the communication channel used should be secure (e.g., SSL). Alternatively, the system itself can employ cryptography etc.

Returning now to the bot code acquisition process, the botServer 350 may already have a copy of the corresponding sBot class for operation with the mBot. (Indeed, the botServer 350 could even be hosted on the same site as the bot developer site 310.) If so, the botServer 350 creates an instance of the requested sBot and assigns an identifier to it corresponding to the mBot that made the request. If the appropriate sBot code is not already present, the botServer 350 obtains the appropriate sBot code from the bot developer site 310 by download link 362. Authentication of that code, security issues, payment and other particulars are discussed later in this description. At the botServer, after the sBot is installed, a message originating from botMaster 320 is communicated to the sBot code to initialize it to carry out the task requested by the user.

Why bifurcate the bot code? This architecture has several advantages. First, speed and performance are improved because the user need not download the entire bot code; only the mBot portion is downloaded to the user's botMaster. The mBot portion includes the necessary user interface. The botServer provides protection by authenticating the sBot code's source or author and by confining the sBot execution within the confines of an appropriate software container or "sandbox." (Even if the container were breached, the damage occurs on botServer (which is designed to deal with various attacks anyway) rather than on the user's machine.) BotServer also handles licensing, payment and other administrative tasks, thereby reducing loading on the client side. This architecture allows bots to be accommodated and executed at a secure platform that also gives the user fine-grained control over what user data are exposed to other users (or bots). Other features and advantages of the new bot architecture will become apparent as each component is described in turn in greater detail below. Generally, there are very different requirements that mBot and sBot have to fulfill. For example, mBots often interact with various desktop applications as e.g. Outlook®, so mBot security may have to be relaxed in some cases. Since botMaster doesn't have to scale, mBot also doesn't need to be put to sleep so often. This allows mBot to possess its own threads that execute for a long time. sBot on the other hand should be fully event-driven, protocol-oriented, and immune to server scaling issues.

2. BotMaster Architecture.

The primary function of the botMaster program is to implement a platform for managing and executing bots at the client side, i.e., the user's platform. The botMaster provides a universal platform for all types of bots, which can be created by the user, acquired from third-party developers, or in some cases will be provided by botServer owners (and downloaded by the user). For example, a business may wish to host a botServer to support its business goals. The botServer would be open to receiving individual customer bots designed for interacting with that particular botServer. The botServer owner can provide specifications for a developer to implement in such a bot. An example of such an arrangement is described later with regard to FIG. 12. (EU research grant.)

The botMaster includes a service layer for integration with various application programs, such as Microsoft Outlook (for sharing calendar data, exchanging business cards, etc.), Microsoft Money (for performing payments in the Internet environment), Web Browsers (for gathering user browsing preferences) and other Microsoft "Office" applications. Integration with these applications is a key part of enabling the botMaster to build a User Model—knowledge about the user's job, interests, hobbies, likes and dislikes, etc. The botMaster also provides access to the botServer (or many botServers) via the botBox paradigm.

Figure 5:
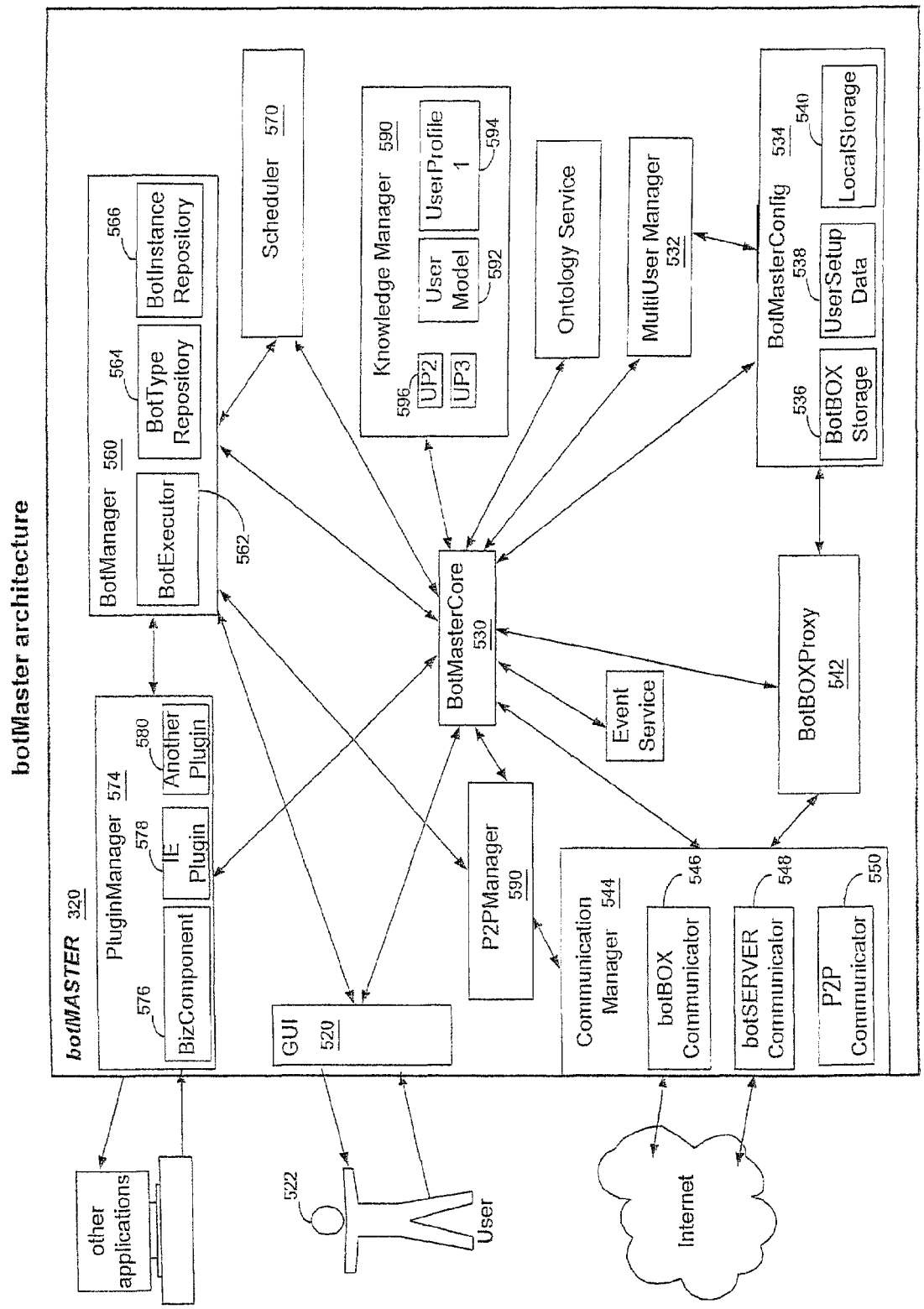
FIG. 5 is a functional block diagram of a botMaster program architecture.

Referring now to FIG. 5, the botMaster comprises several components (though not all of them are essential in every instance). The first component is a botManager component 560 for managing one or more bots, creating or acquiring them, installing them, configuring them, executing them, terminating them, etc. These operations are described in greater detail later. As mentioned before, the botMaster need not host the entire bot program. Rather, only the client side program—mBot—is installed by botManager on the botMaster/client machine.

Figure 14A:
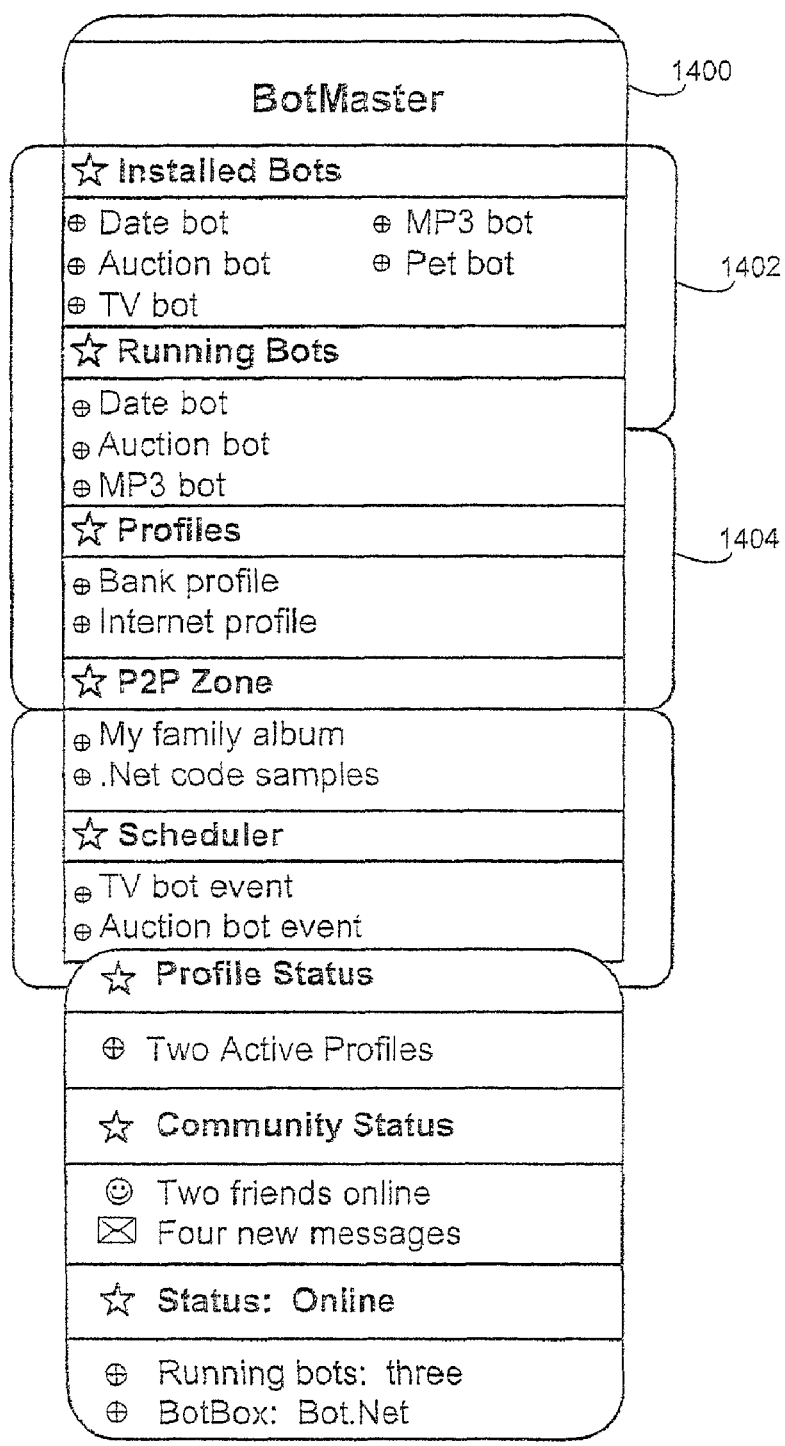
FIG. 14 is a series of illustrations of one example of a graphical user interface for obtaining, configuring and managing the users' bots.
Figure 14B:
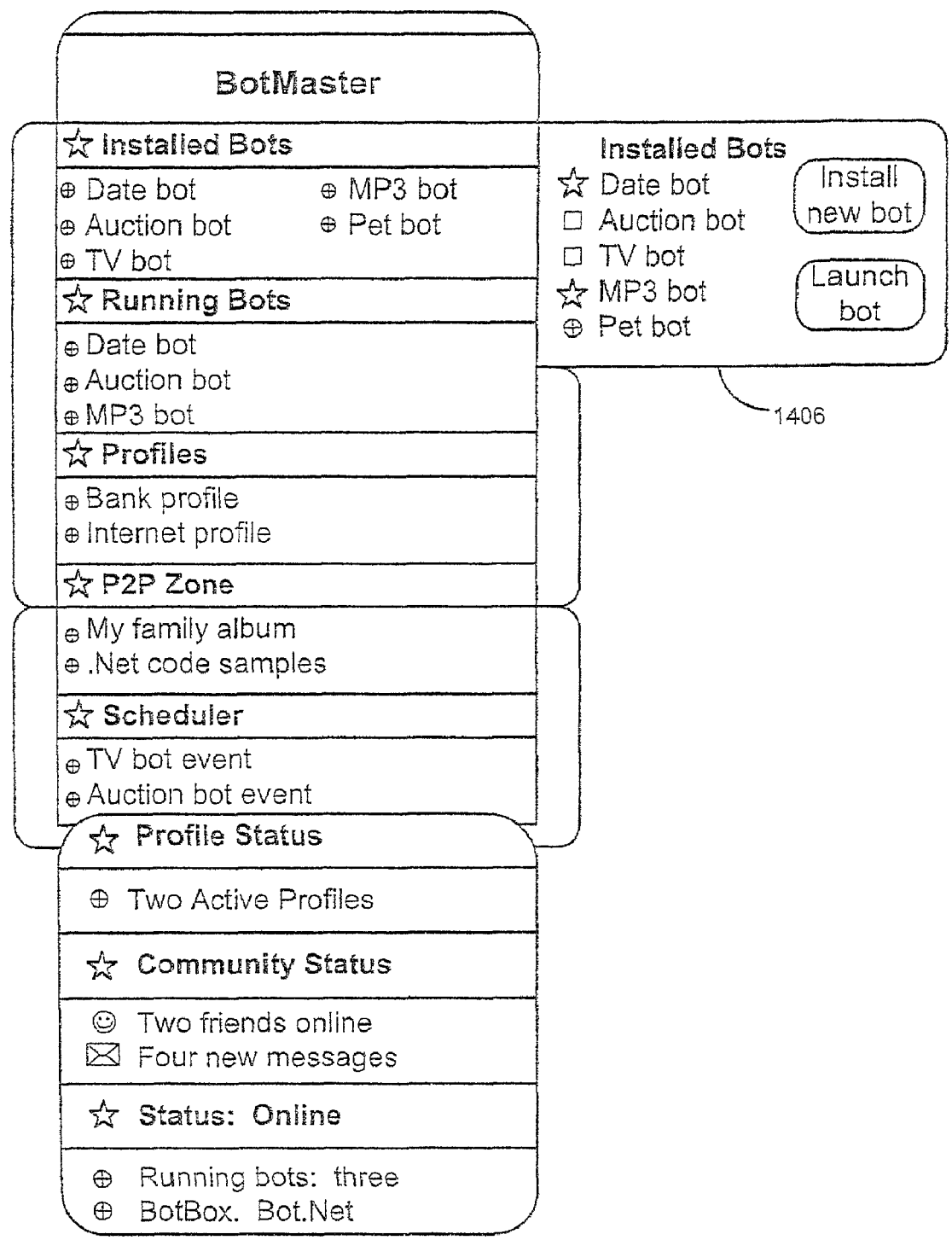
Figure 14C:
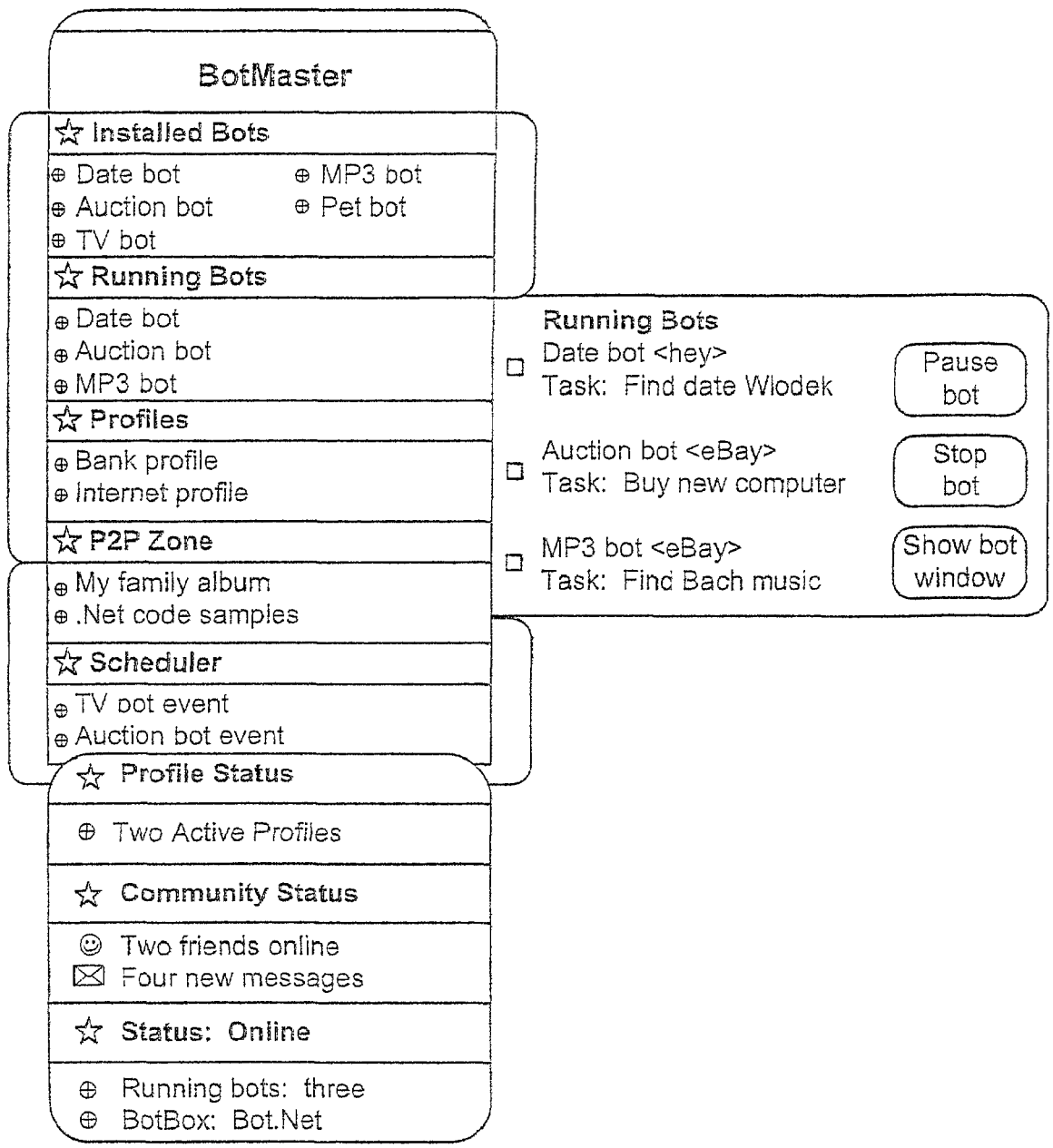
Figure 14D:
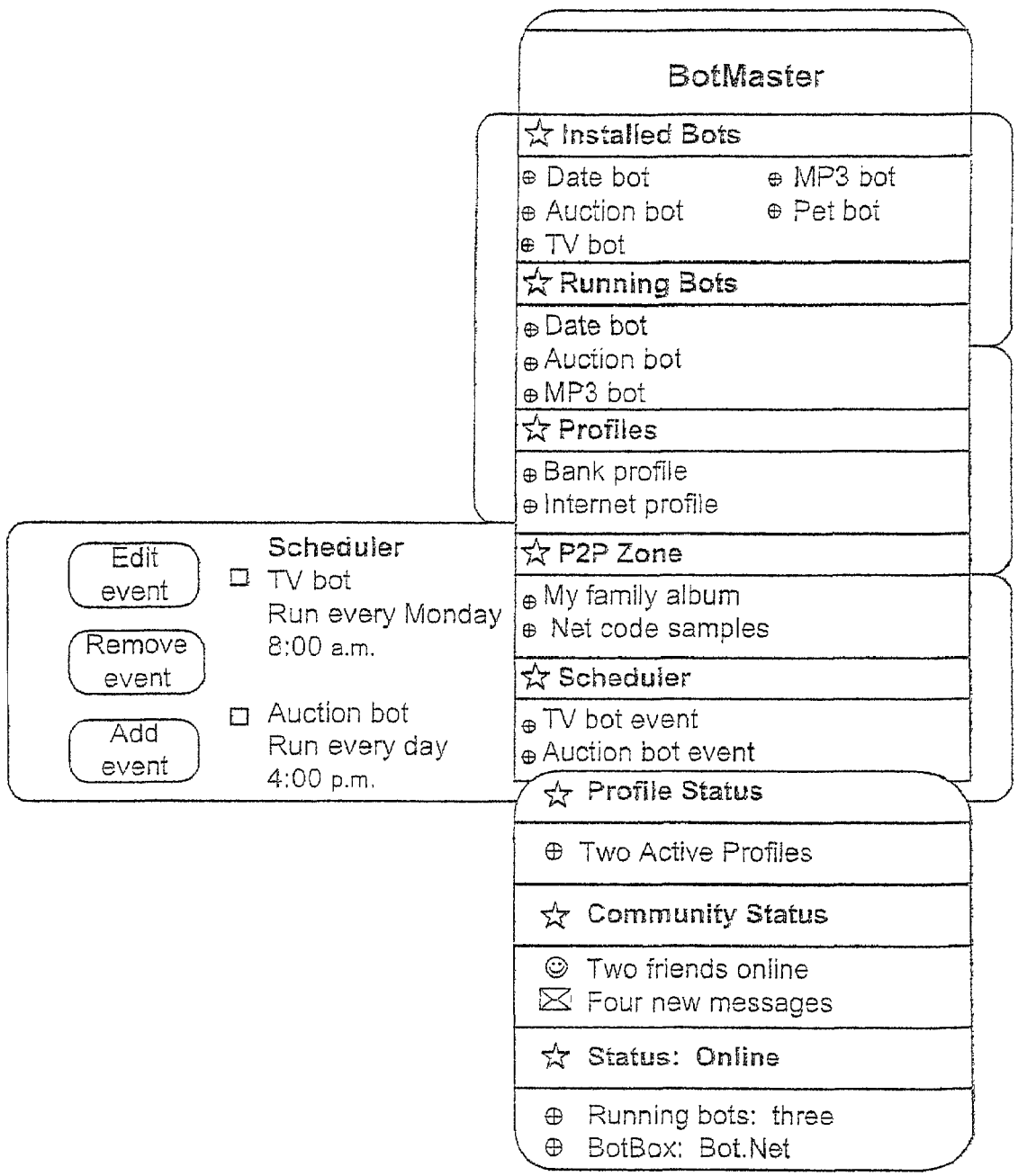

The botMaster also includes a presentation layer for interaction with a human user. More specifically, the presentation layer implements a graphical user interface (GUI) 520 to enable a user 522 to configure or acquire a bot as desired. Through this interface, the user can deploy any number of bots to carry out a wide range of operations without the user having to have any particular software expertise. Preferably, the GUI of botMaster is distinct from the logic functions of the program so that various GUIs can be interchanged to accommodate user's preferences or operating environment. For example, different GUIs can be implemented having a Microsoft Outlook style, ICQ-like interface, or a Web page appearance. One example of a botMaster GUI is illustrated in FIG. 14. Although the patent drawing is monochrome, color can be used effectively to provide visual clues to operation of the interface. For example, in the botMaster interface 1400, each of the virtual "tabs," 1402, 1404, etc., can have a color that matches a corresponding one of the operational fields, installed bots, running bots, profiles, etc. Clicking on a selected tab expands the display to show more detail of the selected topic. FIG. 14B for example shows the "installed bots" tab 1406 activated; the expanded display lists all of the installed bots and provides buttons for installing a new bot or launching one of the installed bots. The other items shown in FIG. 14 reflect the various types of actions and information made available to the user by the botMaster program. Variations of the user interface style and appearance are limited only by the creativity of the designer; FIG. 14 merely introduces the topic.

Referring once again to FIG. 5, a botMaster architecture should: (1) provide a universal platform for hosting bots at the client side; (2) implement a service layer for integration with other applications; and (3) provide access to the bot platform (via botBox) from the user's home, office, Internet café, airport or any other venue where digital communication facilities are available. Broadband wireless access (BWA), Internet kiosks, etc., are rapidly making the Internet ubiquitous. The botMaster facility will act as the user's communication center through which remote bot activity can be managed. The botMaster includes a plug-ins manager 574 to provide various plug-in type interfaces and services to executing mBots. These can include, e.g., a business component 576, a web browser plug-in 578 and other plug-ins 580.

Preliminarily, the botMaster program itself is downloaded or otherwise installed on the user platform. To initialize the botMaster, the user interacts via the GUI 520 with the botMaster core 530, which in turn communicates with a botMaster configuration component 534. A multi-user manager 532 can be implemented to support more than one user. Each user will have its own setup data, botBox, local storage 540, etc. In botMaster configuration, user setup data 538 is stored and botBox storage 536 is initialized. A knowledge manager component 590 can immediately begin developing the User Model (592).

User Model data are acquired over time by "watching" the user's activities via the GUI 520. Recall that interfaces are provided to various user applications such word processing, email, and web browser. The user's actions are captured as data messages and routed by the botMaster core 530 to the Knowledge Manager component 590 for recording in the User Model 592. Knowledge of the user—the user model preferably is stored as a conceptual graph. It may be imported from external sources, for example using RDF, the Resource Description Framework. RDF is a framework for metadata under development by W3C to provide interoperability between applications that exchange machine-understandable information on the Web. It can use XML as an interchange syntax.

"User Profiles" can be thought of as essentially masks or filters applied to the user model to expose selected aspects of the model to a particular agent (mBot). The User Profile construct enables the user to precisely control what user information is exposed to a particular bot. For example, a "banking profile" might include the user's bank account and PIN numbers. This profile, say 594 in FIG. 5, would be selected for use by the user's banking bot. On the other hand, a general "Internet profile" might include almost no personal information or perhaps a pseudonym or a graphic caricature. That profile can be selected for a bot charged with searching the Internet for a used car.

Another function of the "user profile" is to act as an intermediate communication layer insulating the user botBox account (on the botBox server explained below). In this way, the user's actual e-mail address, IP address, or any other identifying information need not be exposed at all. All external communications will go to the selected user profile, implemented through the user's botBox running on a remote server. The "outside world" (internet, bots, plug-ins, etc.) can only access the user profile. Generally a user needs only one botMaster, although possible alternatives are mentioned later. The botMaster generally requires establishing a botBox before beginning remote bot operations.

3. BotBox Setup.

Referring again to FIG. 5, establishing a botBox is initiated by the user or prompted by botMaster through the GUI 520. The GUI communicates via the botMaster core 530 to a botBox proxy component 542. The botBox proxy component initializes local botBox storage 536 through the botMaster configuration component 534 and then utilizes a communication manager 544, and more specifically a botBox communicator component 546, to send a message to request initialization of a corresponding botBox on a botServer. Any botServer (with botBox facilities) can be used. Preferably, the user will want to select a botServer with high availability if the user bot(s) need to operate around the clock. Bots with more modest requirements can have their botBoxes hosted at more modest botServers, or even on their own home PC. The user can relocate botBox later if desired, and could store it (including all bot information) on machine-readable media for subsequent uploading on another platform. For commercial applications, botBoxes should be housed on a reliable server, preferably independent of the user platform. This architecture supports operation of the user's bots while the user is off-line, and ensures the user's privacy.

Figure 9:
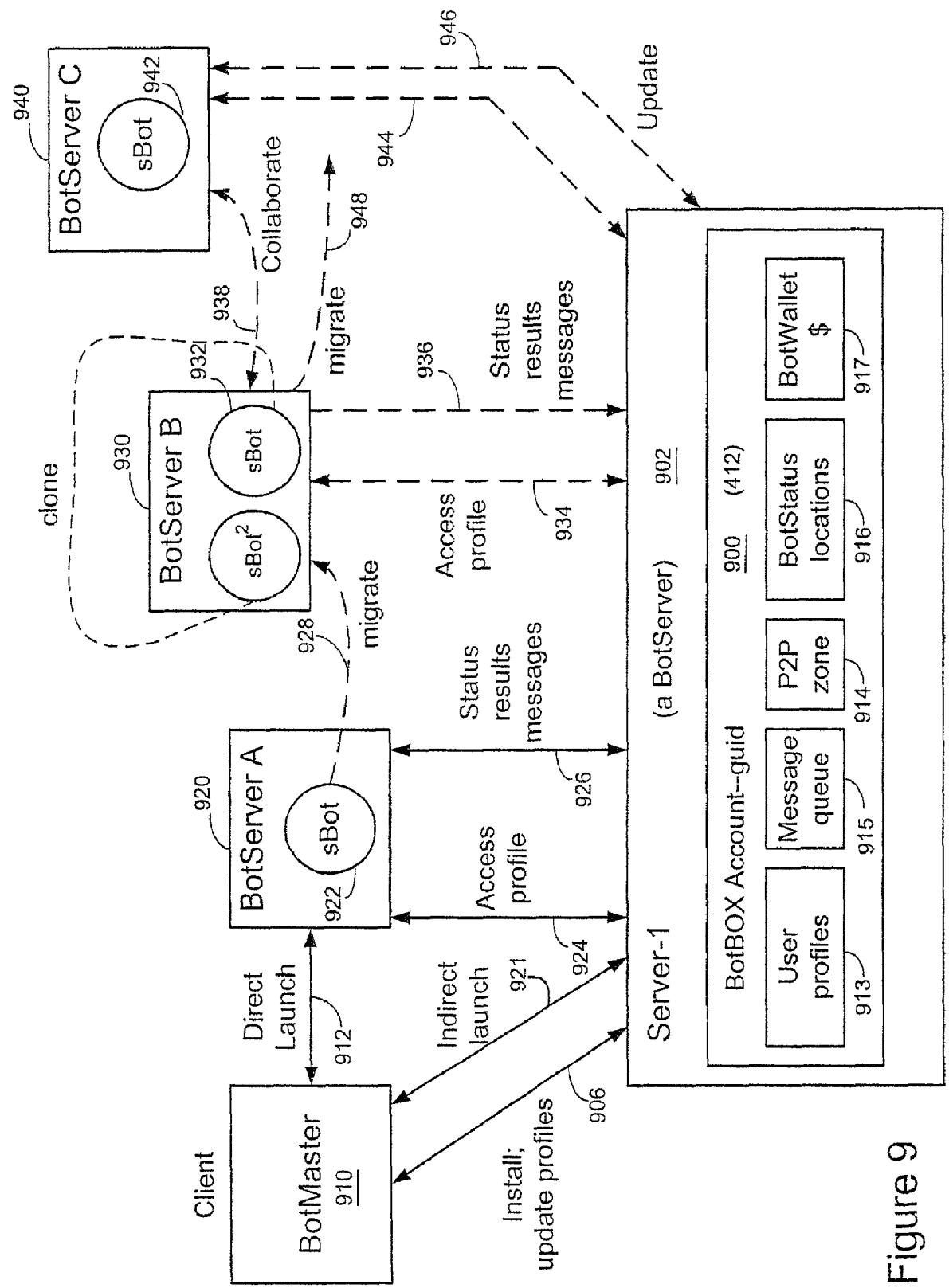
FIG. 9 is a simplified block diagram illustrating operation of the present bot architecture.

An illustrative arrangement is shown in FIG. 9, where the botBox account 900 is part of a first botServer program 902, running on a first server ("Server-1") platform 904. A separate botServer A 920 will host the client's bot (sBot) execution as further described later. The botMaster user selects a botServer (botServer-A in the figure) to locate a botBox account. Message path 906 indicates the process of installing botBox and downloading or updating user profiles. The user may know of a specific botServer location (URL) to use, or botMaster can conduct a search for an available BotServer to provide botBox hosting, for example, using a discovery service like UDDI (Universal Description, Discovery and Integration service). This is a newly evolving Web service that applications can use to dynamically discover other on-line services using a simple XML interface. Having discovered a suitable botServer to provide botBox hosting, the user's botMaster can now communicate with the selected botServer.

Figure 4:
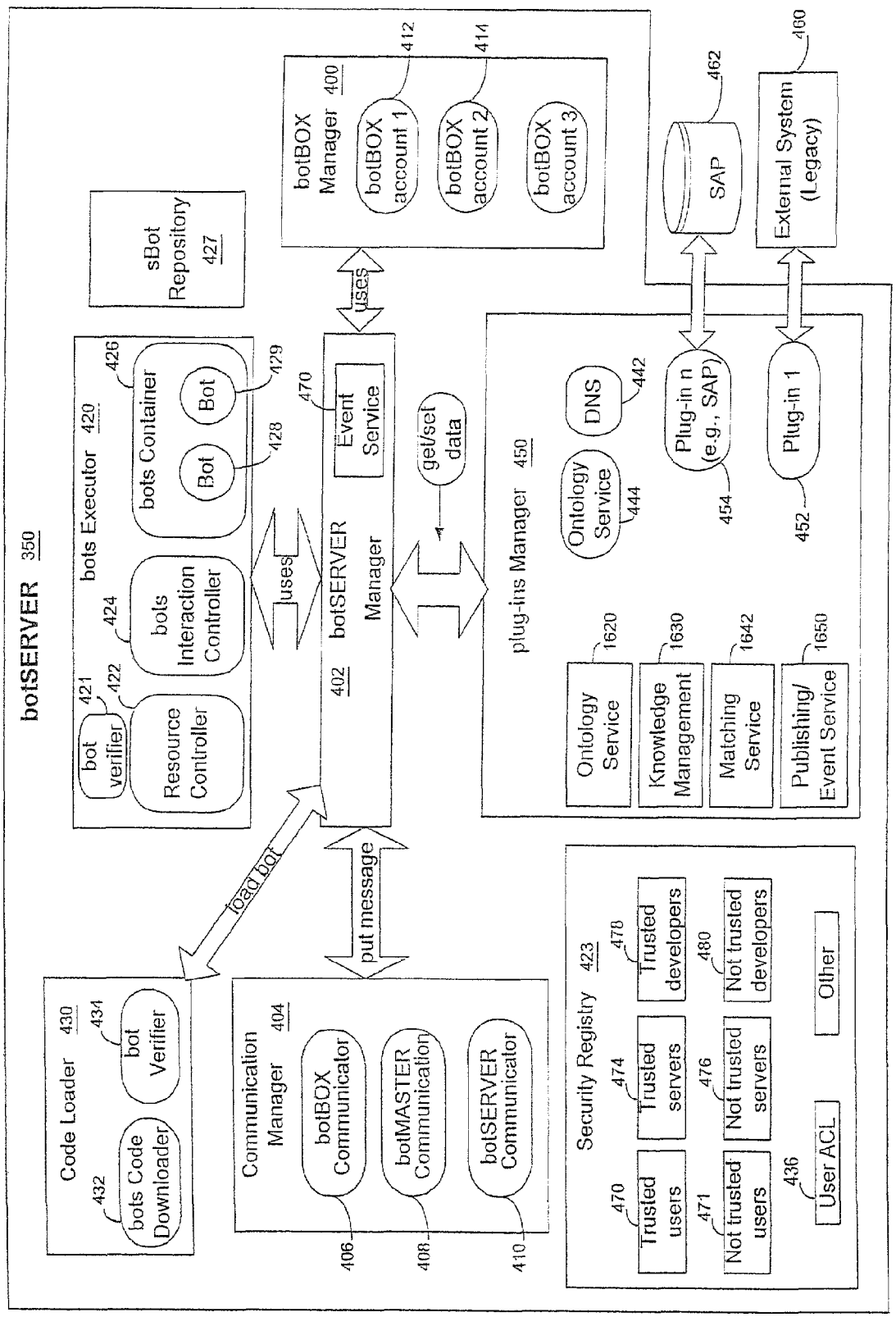
FIG. 4 is a functional block diagram of a botServer program architecture.

Referring now to FIG. 4, to initialize a botBox account, the selected botServer first receives a request from the user's botMaster. The request is received by a communication manager 404. The communication manager recognizes the request as being directed to the botBox manager 400. The botBox communicator component 406 of the communication manager specifically recognizes the request as a request to create a new botBox. The request is forwarded by the botBox communicator 406 via the botServer manager 402 to the botBox manager 400. The botBox manager 400 complies with the request by creating a new botBox account, say 414, and returning a globally unique identifier ("guid") associated with the newly created botBox to the botMaster. This communication is directed initially to the botServer manager 402 that, in turn, dispatches the communication to the communication manager 404. In the communication manager, the botMaster communicator component 408 then sends an appropriate message back to the requesting botMaster, including identification of the newly created botBox account, preferably, a guid. Initializing a botBox account is generally prerequisite to installing a bot on a botServer.

Referring once again to FIG. 5, a botBox proxy 542 is set-up on botMaster to store an image of the actual (remote) botBox if the user is offline, to provide communication with the actual botBox when user is online, and to synchronize the botBox contents when the user goes online. A response such as a confirmation message is returned from the remote server via the botBox communicator to the botBox proxy. The botBox proxy 542, in turn, directs a response via the botMaster core back to the GUI 520 for presentation of a confirming message to the user. At this point, a botBox has been established at both the client (botMaster) and the server (botServer) nodes. Now the user is ready to deploy a bot.

The user, via botMaster (which may be running in a browser) first identifies and installs a desired bot on the client platform. More specifically, the mBot piece installs and runs on the client machine. The botMaster interface enables the user to configure each bot, and assign privileges as the user deems appropriate. The user also assigns a User Profile to each bot as further discussed later.

Figure 15:
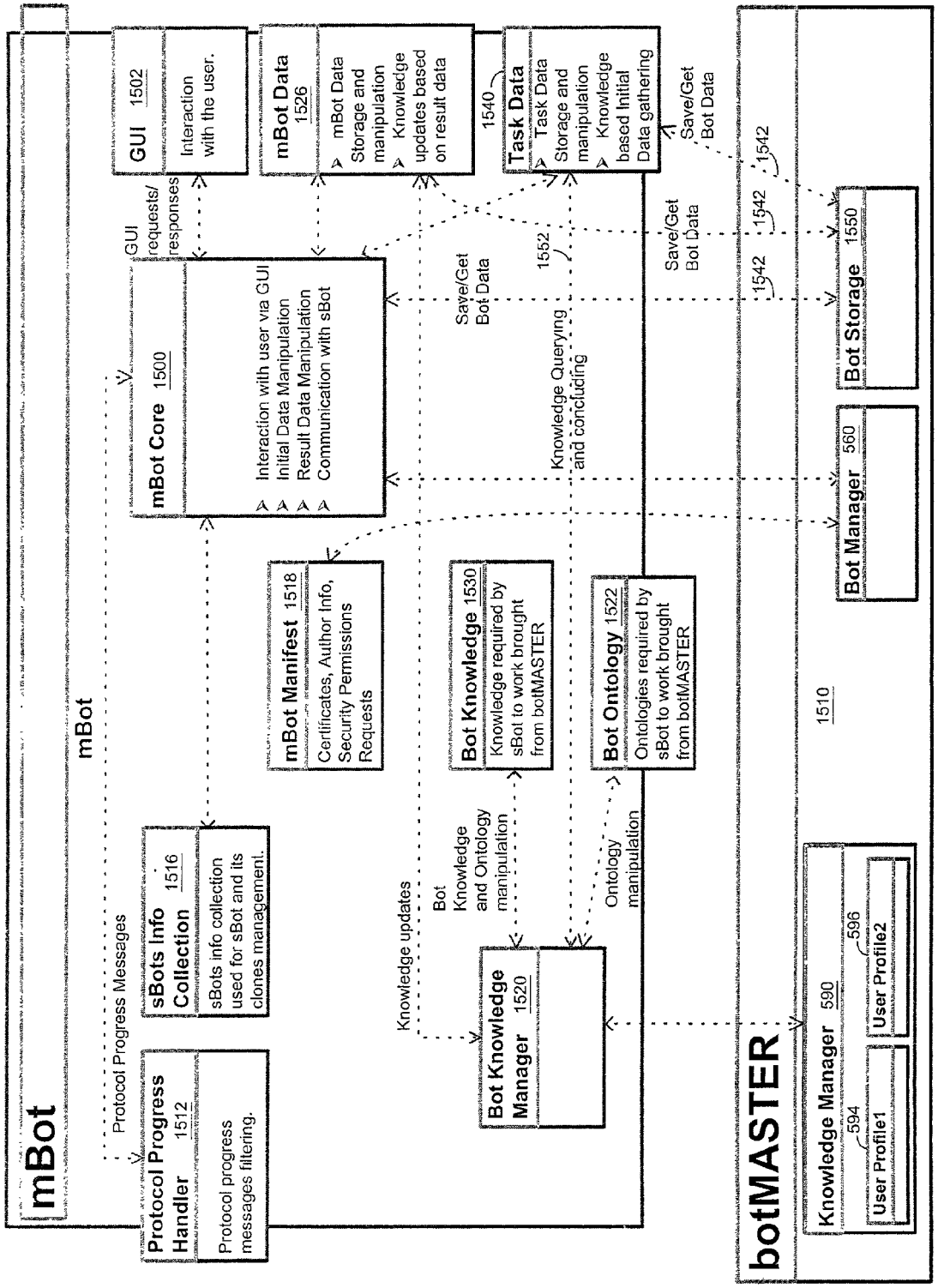
FIG. 15 is a software model showing the principal objects and messages of an illustrative mBot architecture.

The user can find a bot, for example, on a web site, and select a compatible version to download. The bot source (say, a developer) may offer the subject bot for free, for lease, or for "purchase" (generally a license without a time limit). A bot description file is first downloaded and botMaster can check certificates of the vendor. Selected vendors can be approved for auto-acceptance, i.e. acceptance without querying the user for specific approval. If privileges requested by the bot exceed pre-approved parameters, botMaster can query the user for approval. Runtime properties are verified for compatibility with botMaster capabilities (e.g. presence of required plug-ins, GUI version etc.) If any of these steps fail, the bot is not downloaded. Assuming all is well, the Bot code is downloaded and verified. The Bot package consistency and authenticity is verified by checking digital signatures (CRC etc.) and the Bot manifest is verified against the description file to validate the privileges that are to be granted. In FIG. 15, the mBot manifest 1518 is shown in communication with the botMaster's bot Manager 560. Now the new mBot is installed in the bot type repository 564 (FIG. 5), the bot type is registered and requested security restrictions applied. Once the bot is installed it can be instantiated and launched for use.

Instantiating a bot is initiated through the GUI. A message from the GUI is directed via the botMaster core to the botManager component 560. The botManager includes a bot Executor 562, the bot-type repository 564 just mentioned, and a bot instance repository 566. In response to the user's request to run a bot, botManager determines whether the requested bot type already exists in the repository 564 and, if so, creates a new instance of that bot type in the bot instance repository 566. Confirmation and identifying information are then returned by a message from the botManager component to the user (GUI). For identification, every bot instance has a unique guid. Before actually using the bot, the corresponding sBot must be installed on a botServer. We next examine the botServer architecture.

4. BotServer Architecture

As mentioned, the user (botMaster) downloads only a portion of the bot, the mBot, which is responsible for user interface, task configuration, graphical presentation of results, and other limited functionality. This reduces the communication bandwidth requirements and load on the client platform. The botServer, on the other hand, downloads and executes the sBot part that is responsible for executing the logical work of the bot.

Referring now to FIG. 4, a simplified block diagram introduces the botServer architecture in a presently preferred embodiment. The general goal of botServer is to provide stable and secure execution of sBots, potentially many sBots, while ensuring each user's data privacy and anonymity. The botServer architecture is highly scalable and extensible in order to accommodate a large number and wide variety of bots executing simultaneously. A botServer can provide botBox hosting, as mentioned above. The botServer platform also enables financial transactions, including payment for its services, such as bot usage, as well as payment for external services such as utilization of third party databases. Examples of these applications are given later.

One important feature of the botServer is that it provides a platform for constant bot activity without requiring the user (bot owner) to stay on-line. In other words, the user's bot continues to carry out its intended functionality (by executing sBot on botServer) without user constant supervision. The botServer also provides a forum for sBots to meet and exchange information, which again can be carefully controlled for security and privacy. (A bot "meeting place" is described later with reference to FIG. 13.) The botServer can be used to realize secure access to proprietary information based on XML schemas, ontology-based information or the like, and it provides a convenient platform for deployment of new services or integration with existing services, as further described below. Referring again to FIG. 4, the botServer is controlled primarily by a botServer manager (core) component 402. The various aspects of the botServer architecture can be described by explaining the principal processes that involve the botServer.

BotBox accounts are implemented on a botServer, managed by a botBox manager 400. However, the botBox manager is independent of the bot Executor (420) and other components of the botServer, such that the botbox accounts maintained on a given server may not be affiliated with any sBot executing on that same botServer platform. Conversely, the botServer can execute sBots in the bot Container (426) that are linked to botBox accounts on another server somewhere else. In some cases, the same botServer platform may provide both botBox hosting and sBot execution for the same bots, but this is not the general case. A botServer in some applications may have no local botBox facilities.

Figure 17:
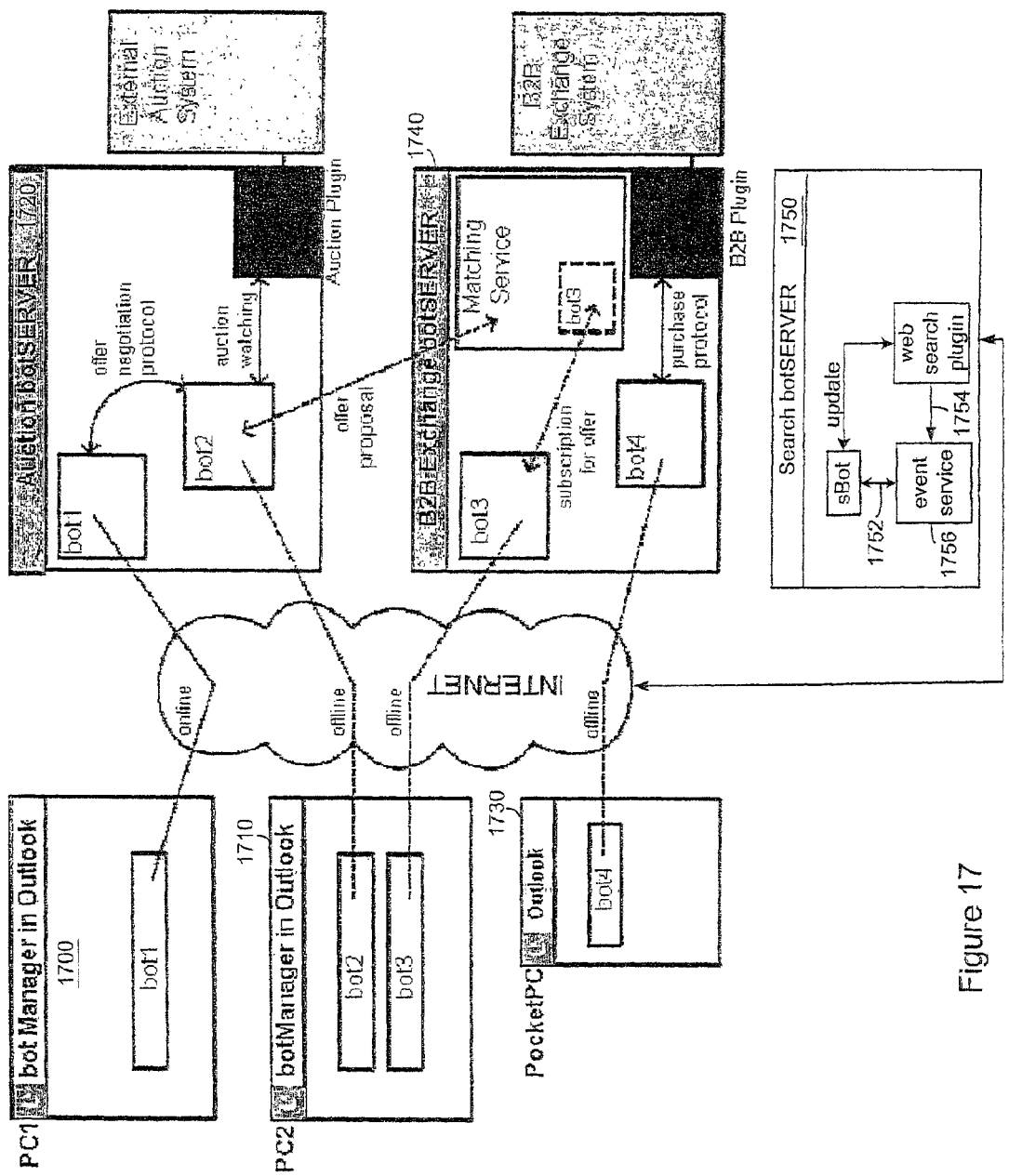
FIG. 17 illustrates one example of bot activities.

Plug-ins: The botServer standard services can be extended by a mechanism of plug-ins. A plug-in is a software component installed by botServer administrator within the plug-ins manager (450) which communicates with other plug-ins and bots via the botServer manager 402 using messages. From the usability point of view, a plug-in is somewhat similar to a bot—it has an unique ID, understands bot messages, participates in protocols etc. A plug-in, however, never migrates, cannot be automatically downloaded and installed, and usually has much higher system security permissions. A plug-in also may possess any number of system threads (since it doesn't have to strictly adhere to a request-response execution schema). Plug-ins are usually used to interface with various external systems, perform demanding real-time operations and provide other services. For example, FIG. 4 illustrates a plug-in 454 for interfacing with an SAP server 462. Another plug-in 452 interfaces with a legacy system 460 such as an enterprise database running on a mainframe. FIG. 17 shows auction and B2B plug-ins on botServers.

Plug-ins may be configured so that they have the same ID on every server. That strategy relieves bots from having to search for an appropriate plug-in if they know the requested plug-in ID. Some standard system services (e.g. Ontology service 1620 or botDNS 442) may be implemented as plug-ins as well. Specialized plug-ins can be created by botServer owners to provide services that make the server more attractive to bots (e.g. in order to advertise some other profitable services). Other examples shown in FIG. 4 (and FIG. 16) are knowledge management service 1630, matching service 1642 and a publishing/event service 1650. Generally the plug-ins should be created to be compatible with botServer scaling.

Installing a bot (sBot) on the botServer again begins with botServer receiving a request in the communications manager 404. (As noted, this botServer is not necessarily the same botServer that hosts the user's botBox. See FIG. 9.). The communications manager recognizes this message as a request intended for the botBox manager. More specifically, the botBox communicator 406 recognizes the request as data intended for a specific botBox (identified by its guid), say botBox account 2, reference number 414. (A different user would have a different botMaster and use a different botBox account, say 412.) The request is sent on to the botBox manager 400 via the botServer manager 402, as before. The botBox manager receives the request and forwards it to the intended recipient, botBox account 2. This message causes the botBox account 2 to create a request for creating an instance of the bot requested in the message. This request is dispatched by the botBox via the botBox manager to the botServer manager 402. If the bot is to be launched on a different server, the request is forwarded to the remote botServer manager using the standard messaging schema (i.e., via the communication managers on both sides). The botServer manager sends this request to the bot Executor component 420. In the case of a remote startup server, the Executor first checks (using security registry 423) to confirm that there are appropriate rights to process the request (i.e. whether the bot type, botBox server or bot user are on a list of parties that are not trusted). Then the bot Executor 420 receives the request and employs a bot verifier component 421 to check for the existence of executable code (sBot) corresponding to the request in a local sBot repository 427. If the sBot is found there, it can be instantiated into the container.

In this illustration, we assume that no such sBot code is found. The bot verifier 421 notifies the bot Executor 420 of this fact, and the bot Executor requests that a code loader component 430 download the necessary sBot. This request is dispatched by the botServer manager 402 to the code loader component 430. The code loader 430 instructs the bot code downloader 432 to fetch and install the sBot code. The code loader can use a location (e.g., URL) provided by the user's botMaster to locate the sBot code. More specifically, the botMaster can provide a "ticket" to the botServer that identifies the required sBot, a URL for obtaining the sBot, and proof of payment for the bot if required. This ticket would have come to botMaster with the mBot.

The code loader 430 can implement added security in various ways. For example, the code loader can access control list (ACL) 436 that defines what bots a given user may or may not launch, and from whom sBot code can be downloaded. If the user is authorized and the developer approved, a bot code downloader 432 downloads the executable sBot code and a verifier 434 checks its authenticity. Then the loader installs the new bot in a bot Container 426. Next, the corresponding botBox 414 prepares a message to the bot Executor 420 containing data for the newly created bot instance 428. BotBox 414 sends the message via the botBox manager and the botServer manager to the bot Executor 420, which interprets the request as data intended for the specific bot 428 and delivers the data accordingly. Communications among botServer components can be implemented using known technologies, such as DCOM, CORBA, Java RMI, NET remote procedures, etc.

In a presently preferred embodiment, a "Security Registry" component 423 is implemented in the botServer architecture. It can include the ACL (436), and lists of trusted users 471 and not trusted users 472; trusted servers 474 and not trusted servers 476; trusted developers 478 and not trusted developers 480. Generally, these lists should be described as black/white lists—whatever is on a black list is not trusted, ever. Entities on a white list are always trusted, and the remaining entities are assigned the default server security policies. So, for example, a request from a trusted user to download a bot from a trusted developer could proceed automatically without further authorization or confirmation. This type of security information could potentially be distributed, but here it is provided on the botServer.

5. Bot Execution and Communications.

FIG. 8 summarizes the principle processes described thus far. Referring to FIG. 8-A, a simplified flow diagram illustrates the steps of (1) installing botMaster on the user platform; (2) configuring the botMaster and beginning to build a user model; (3) selecting a botBox host and setting up a botBox; and (4) selecting and downloading a desired bot to botMaster. Next, referring to FIG. 8-B, the user (via botMaster) (1) configures the mBot; (2) assigns a user profile; and (3) instructs the bot to execute. BotMaster also synchronizes (4) the selected user profile with botBox. These messages are represented by link 906 in FIG. 9. FIG. 8-C summarizes the remote operations on botServer: (1) select or find an appropriate botServer; (2) botMaster sends a launch message; (3) botServer installs or instantiates the corresponding sBot; (4) botServer accesses the user profile on botBox; and (5) the sBot executes on botServer and communicates with the user profile on botBox. These operations are illustrated in the context of FIG. 9 where the launch message 921 goes from botMaster to botBox, and then botBox communicates with the botServer 920 to install and launch the sBot. The botServer 920 accesses the assigned user profile via 924, and transmits status and results messages to botBox via 926. Now the sBot is running (and the mBot/botMaster can be temporarily shut down). The sBot executes in a container (or "sandbox") 426 for safety, and subject to a resource controller component 422 of the bots Executor 420. Particular aspects of bot execution including protocols, meeting places, local services, migration and messaging are further described below.

Referring once again to FIG. 4, we next assume that an installed and executing sBot, say 428, wants to find another bot to obtain services. One scenario is as follows. The bot Executor 420 forwards the "find me a bot" request to plug-ins manager 450. The plug-ins manager, in turn, forwards the request to an appropriate service. These extension services may include, by way of example, an ontology service 444 or a botServer DNS service 442. Assume for illustration that the DNS service 442 identifies an appropriate bot (or the specifically identified bot) in this instance. A response describing the found bot or at least its location is prepared by the DNS service and sent back to the requesting Bot 428, via the bots Executor. The requesting bot 428 receives the information about the identified bot, which can then be installed using the processes described above, so that the second bot 429, is now executing as well within the bot Container 426. It should be noted that the cooperating bot need not be installed on the same server. For example, bots can communicate and thus interoperate over a network such as the Internet using the botServer message communication channels or directly using the new SOAP, for example where a bot needs to interact with another bot written in a different language. On a single server, the two bots can interact in an appropriate "meeting place" as explained below.

In a presently preferred embodiment, a DNS (domain name service) 442 will be used to register botServers and plug-ins on a botServer. Accordingly, DNS will be available for a bot to search for an external plug-in with which to communicate, or to find some botServer to migrate to. A bot seeking to launch another bot would communicate first with a specially designed plug-in that can identify the most appropriate one (e.g. using matching service), and provide a URL or similar identifier or locator to enable downloading the new bot.

SOAP (Simple Object Access Protocol) is a way for a program running in one kind of operating system (such as Windows) to communicate with a program in the same or another kind of an operating system (such as Linux) by using the World Wide Web's Hypertext Transfer Protocol (HTTP) and its Extensible Markup Language (XML) as the mechanisms for information exchange. Since Web protocols are installed and available for use by all major operating system platforms, HTTP and XML provide an already at-hand solution to the problem of how programs running under different operating systems in a network can communicate with each other. SOAP specifies exactly how to encode an HTTP header and an XML file so that a program in one computer can call a program in another computer and pass it information. It also specifies how the called program can return a response.

FIG. 10-A illustrates a sample message format for communication between bots over a network. SOAP is somewhat similar to the Internet Inter-ORB Protocol (Internet Inter-ORB Protocol), a protocol that is part of the Common Object Request Broker Architecture (Common Object Request Broker Architecture). Sun Microsystems' RMI (Remote Method Invocation) is a similar client/server interprogram protocol between programs written in Java. One advantage of SOAP is that program calls are more likely to get through firewall servers that screen out requests other than those for known applications (through the designated port mechanism). Since HTTP requests are usually allowed through firewalls, programs using SOAP to communicate can be sure that they can communicate with programs anywhere. To illustrate, FIG. 10-B shows a message (via TCP/IP protocol, for example) traversing the Internet to a firewall platform 1020, at port 80. The firewall sends the HTTP message to the web server 1022, which in turn reads the SOAP header and redirects the message to a botServer 1024.

Local communications to and from executing bots are handled locally by the bot Executor. If a first bot, say 428, attempts to send a message to a second bot, say 429, the bot Executor first checks with a bot interaction controller 424 to determine whether bot 428 has appropriate execution rights. If so, the bot Executor 420 forwards the requested message or information from bot 428 to bot 429. Bot 429 receives that information and attempts to send back a reply or response. Again, the bot Executor first inquires of the interaction controller whether bot 429 has the necessary execution rights to transmit a message to the first bot 428. The bot interaction controller 424 again responds to the bot Executor 420 with respect to the bot 429 execution rights. If appropriate rights are found, the bot Executor forwards the requested message from bot 429 to bot 428. Various messaging technologies and protocols are known that can be used in this context. Preferably, the software components described here are implemented using an object-oriented technology, such as VB+, C++, C#, or the like. General external communications with the botServer are handled by the botServer Communicator component 410.

Many other arrangements of the primary functional components of the botServer could be used. The presently preferred embodiment, described here, is well suited to object-oriented implementations and can be implemented, for example, on the Microsoft.net environment. The botServer architecture is extensible in various ways, primarily through the plug-ins manager, bot code loader and botExecutor constructs.

The botMaster handles mBot to sBot communications. For example, the user (via mBot) may wish to revise the bot configuration or request a progress update. First, the botMaster Communication Manager 544 queues the message. Then botMaster Communication Manager sends the message to the botBox during the next synchronization "heartbeat," i.e. botMaster queries the server for new messages periodically, e.g. every few seconds (dynamically configurable). The transmit component is the botBox Communicator 546 within the botMaster's Communication Manger 544. The botServer Communication Manager 404 (on the botServer hosting botBox) receives the message, and forwards it to the botBox Manager 400. The botBox Manager forwards the message to botBox, e.g., 414, and botBox finds the appropriate sBot. A synchronization "heartbeat" is useful in connection with HTTP type communication between botMaster and botServer (botBox). HTTP is a convenient default protocol because it easily traverses most firewalls. Where straight TCP/IP is used, e.g. on sockets, a heartbeat implementation may be unnecessary because the notification of an incoming message is immediate.

If the target sBot is on the same server as botBox, the message is simply passed along. If not, botBox passes the message to the communication manager requesting it to be sent to the server where the sBot resides. The botBox maintains actual bot location data in component 916 on FIG. 9 ("BotStatus/locations"). Each bot that is instantiated on any server (as a result of cloning, migration, simple instantiation etc.) is responsible for informing the botBox of it's current location. Communication manager sends the message to the other server, and that server forwards the message to bot executor 420, which in turn passes the message to sBot, e.g. 428.

If the intended recipient bot had migrated to another server just before the message was dispatched, the botBox might not have received notification of the new bot location in time to re-route the message. In that case, the remote server (where the bot is not found) returns the message to botBox (informing it of the message delivery exception), and botBox can repeat the attempt later. It should receive updated location information from the bot in the interim. If the message cannot be delivered for a long time (configurable), it can be assumed that the bot terminated or was lost and an exception procedure can be invoked. The particulars will depend on the specific application. The errant bot may simply be removed from the botBox registers, and the mBot and user informed of the bot termination. All messages for that bot can be removed as well. The user can observe bot status in the GUI; see FIG. 14C as an example.

An executing sBot also needs to communicate to its sibling mBot. The sBot sends a message addressed to its sibling mBot. The associated botBox Manager 400 receives the message. If botBox is not on the same server as sBot, botBox Manager passes the message to botBox Communicator 406, which in turn sends the message to the botBox server. BotBox server's communication manager 404 (on a different server) passes the message to botBox Manager. The message is queued on botBox (404 or 414). At the client side, botMaster periodically requests messages from the botBox Communication Manager, which in turn requests messages from botBox. The botBox returns all queued messages. Specifically, the botMaster Communicator component 408 on the server returns all messages to botMaster. Communication Manager 544 confirms delivery to botBox, and botBox removes all send messages from queue (915 in FIG. 9), botMaster communication manager passes messages to Bot Manager. Bot Manager dispatches messages to the appropriate mBots.

6. Bot Migration and Multiple botMasters.

An operating bot can be "recalled" or terminated by the user, again acting through the GUI 520 and using the botMaster application. In response to a request by the user to recall the bot, the botMaster core creates a message that is passed through the communication manager to the user's remote botBox. The next step is to find the corresponding executing sBot, which may have migrated away from its initial botServer host—perhaps while the user (botMaster) was offline.

Referring again to FIG. 9, sBot migration is "tracked" by the user's botBox; it maintains a list of all executing bots, their status and their locations at 916. To illustrate, in FIG. 9, an initial "launch" message 912 can be directed to botServer A 920. This direct launch message—not via botBox—is not the usual case, but can be done. During execution on botServer A, for example, an sBot 922 may decide it needs to execute logic on a botServer B 930. This can be done by launching a second bot (sBot 932) on botServer B 930, at the request of the initial sBot 922. Or, launch of the sBot could be done via botMaster 910. This message 928 is labeled "migrate" on FIG. 9. Message 928, similar to the initial launch message 912, typically would include the botID (guid), the botBox (900) location (URL), and a user profile selection. The new sBot 932 communicates with the identified botBox account 900 via messaging 934 to access the specified user profile, stored at 913. Executing sBot 932 reports its status, results and other messages via a 936 to the botBox on server 902 as well.

A list 916 of all the user's bots and their status and locations is maintained by the botBox. It is reflected in botMaster's botBox proxy. It can be accessed by botMaster as needed. Executing sBot 932 in turn can launch or communicate with yet another sBot 942 on another botServer 940, via a communication link 938. The new sBot 942 also accesses botBox via 944 to access user profile information 913 and provides status, results and messages via 946 to botBox for communication to botMaster 910. At the client side, the sibling mBot can, for example, aggregate results or data provided by multiple sBots (922, 932, 942, etc.) to botBox. In this arrangement, the botBox provides a persistent "anchor" that allows sBots to move about, executing (or causing others to execute) on various servers without limitation, while ensuring that appropriate information, such as user profile data, is always available to the sBots as needed. And conversely, remotely executing sBots, no matter where, when or how many, can always communicate with botBox to report status and results. The reader will appreciate how this architecture enhances extensibility, reliability, portability and robustness.

In general, one user will use one botBox. The user can have multiple instances of botMaster, however, which can share a common User Model if desired. In FIG. 11-A, a user has installed botMaster 1100 at home, for example on a PC. The botMaster 1100 develops a user model "UMA" and user profiles UP1 and UP2. The user also establishes a botBox 1102 running on a remote botServer as described previously. The user's mBots will execute on botMaster 1100 and the sibling sBots will communicate with the botBox 1102. The same user may install a botMaster 1110 at the office. This botMaster maintains a user model "UMB" that may be quite different from the same user's UM developed at home. The office user model will reflect the user's work, while the home user model will reflect the user's personal and family interests, hobbies, shopping preferences, clubs, sports, cars, neighborhood, etc. The office botMaster 1110 also maintains a set of user profiles UP3, UP5 that are based on the office user model UMB but can be customized by the user as desired Oust as the user can customize the home user profiles). The user also establishes a botBox 1112 to be used by the botMaster 1110. The user's employer may provide a server for employee botBoxes, although it could be anywhere on the Internet.

FIG. 11-B illustrates a master-slave arrangement for sharing a botBox. Here, the user installs a botMaster application 1118 on a portable device such as a PDA, cell phone, or automobile Internet appliance. This may be a "thin client" with a simplified user interface (perhaps with limited graphics), and it may lack the software and memory necessary for creating and maintaining a user model. This botMaster 1118 need not establish its own botBox account. Rather, the "thin" botMaster can interact with the same botBox 1112 that was established by the office botMaster 1110. The portable botMaster, in a slave mode, employs the user model maintained by the master botMaster 1110 and the portable program assigns to its mBots one of the user profiles made available on the shared botBox 1112. Creating new profiles or modifying existing ones can be done using the more full-featured office botMaster 1110.

Referring again to FIG. 5, the botMaster architecture can also include a scheduler 570 for launching a selected bot at a predetermined time in the future. This is configured via the GUI 520. At the appointed time, or in response to any other predetermined or predefined input, the scheduler 570 sends a launch message to the botManager 560, instructing it to launch the selected bot by prompting the bot Executor.

Figure 14E:
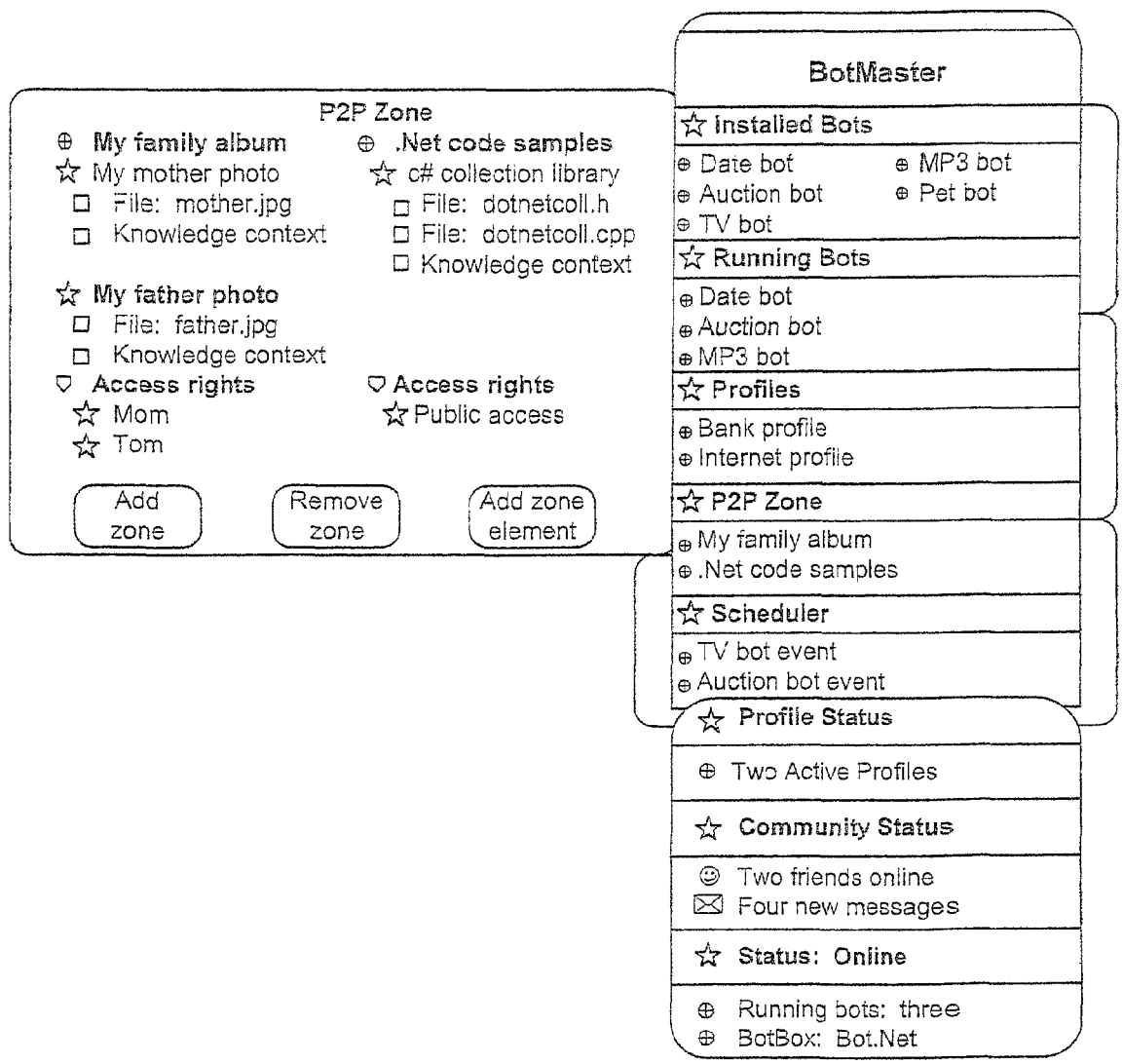
Figure 14F:
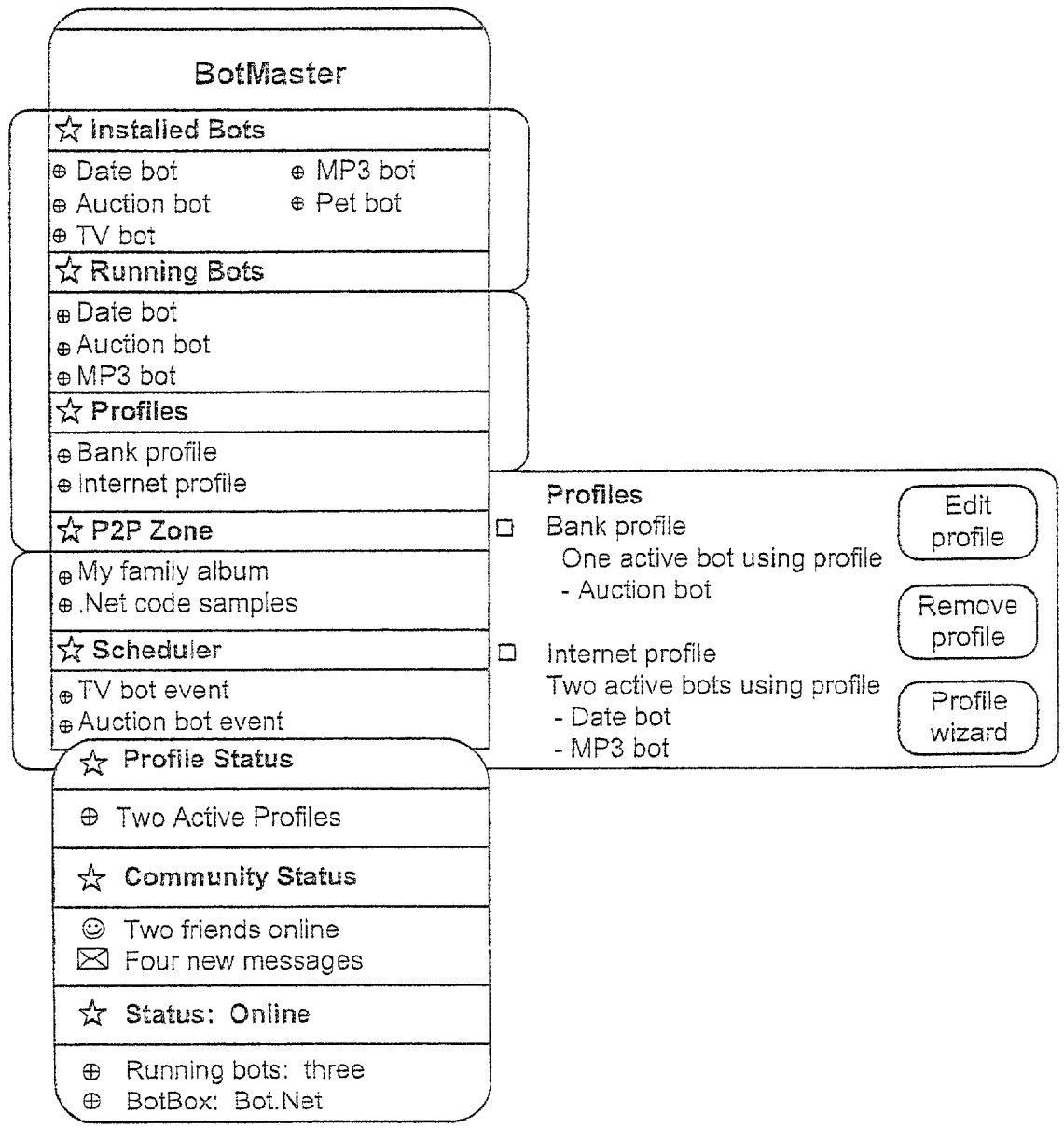

A user can also communicate and share resources with others via the bot platform. Person-to-person or "P2P" transactions are supported by a P2P Manager component 590 on the botMaster platform. The P2P Manager coordinates communications via the communication manager component 544, specifically the P2P communicator module 550, and routes incoming messages (or receives outbound messages) via the botMaster core 530. The botBox preferably implants a "P2P Zone" (914 in FIG. 9) where files for P2P sharing are stored. BotBox controls access to 914 as instructed, yet provides a secure, reliable platform for file exchange. A GUI interface for managing P2P zones is shown at FIG. 14E.

7. SBot Internal Architecture.

Figure 6:
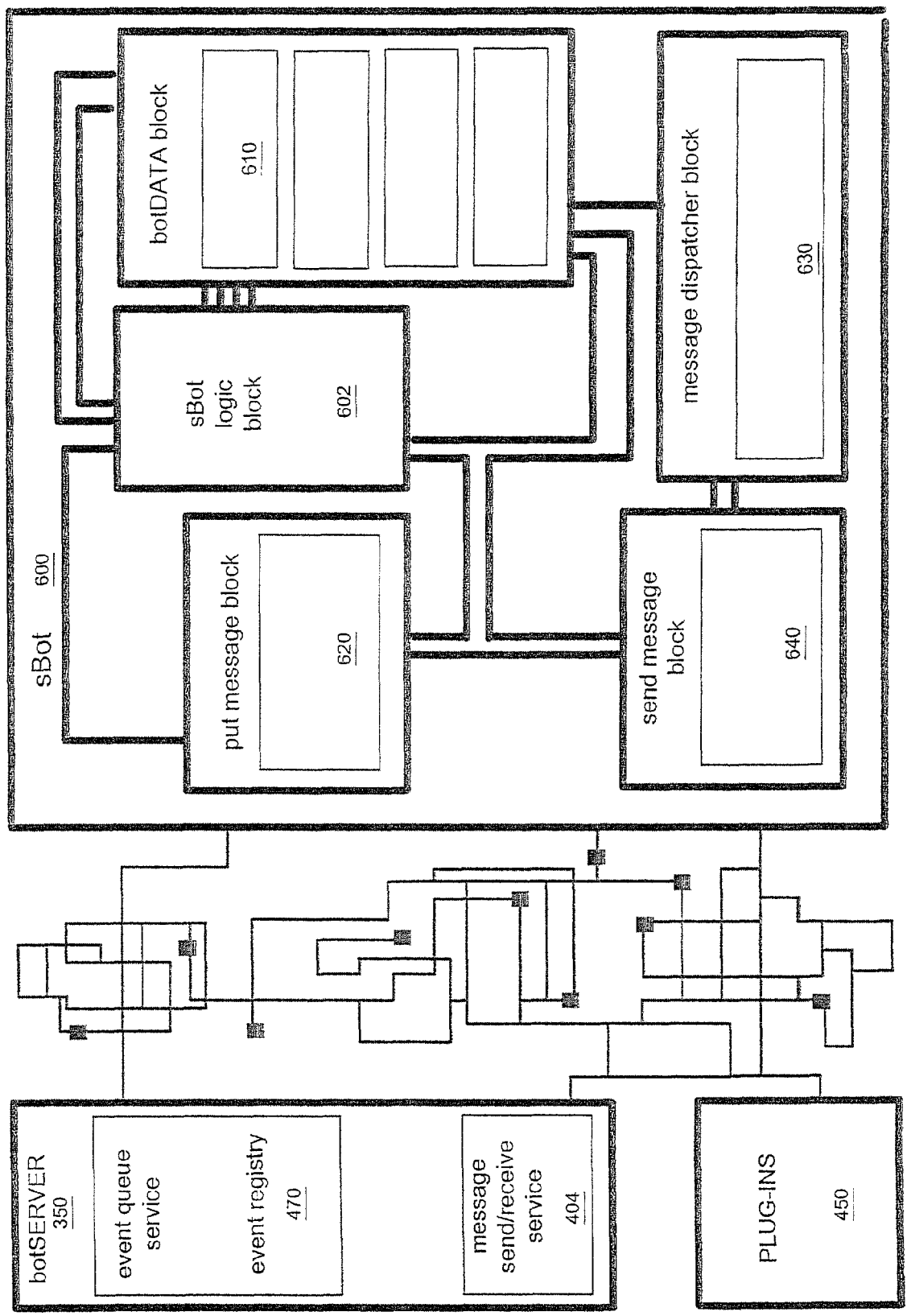
FIG. 6 is a functional block diagram of an illustrative sBot architecture.

FIG. 6 illustrates the principal components of a typical sBot 600, although these features may vary for particular vertical applications. The sBot is basically an executable program that will execute on a botServer. It can be realized in almost any object-oriented language. SBots preferably are platform-independent through the use of technologies such as MSIL (Microsoft Interpreted Language) and CLR (Common Language Runtime) or Java®. The sBot architecture is built around an sBot logic block 602 in which the "business logic" or application level functionality of the sBot is implemented. Additionally, the sBot logic block has access to the following services. First, the sBot logic block 602 can read and write data to a botData storage block 610. The sBot includes a "put message block" 620 for sending messages and a message dispatcher block 630 that can formulate messages, optionally including data from block 610, which are provided to the send-message block 640.

The sBot program uses the bot data block to store all needed data. The sBot can send messages to the corresponding mBot or to a plug-in or another sBot using the send message block, as directed by the sBot logic block. All messages to the mBot are sent using the botServer's communication service. All messages from the sBot are received by the botServer's communication service and dispatched from there as appropriate. Dispatching messages via botServer can include queuing the message for a "store and forward" operation utilizing botBox. The botServer invokes sBot execution by assigning a thread along with an event or state for the sBot to process. This input is provided by a botServer event queue service 470. Another example of an sBot architecture is shown in FIG. 16.

Figure 16:
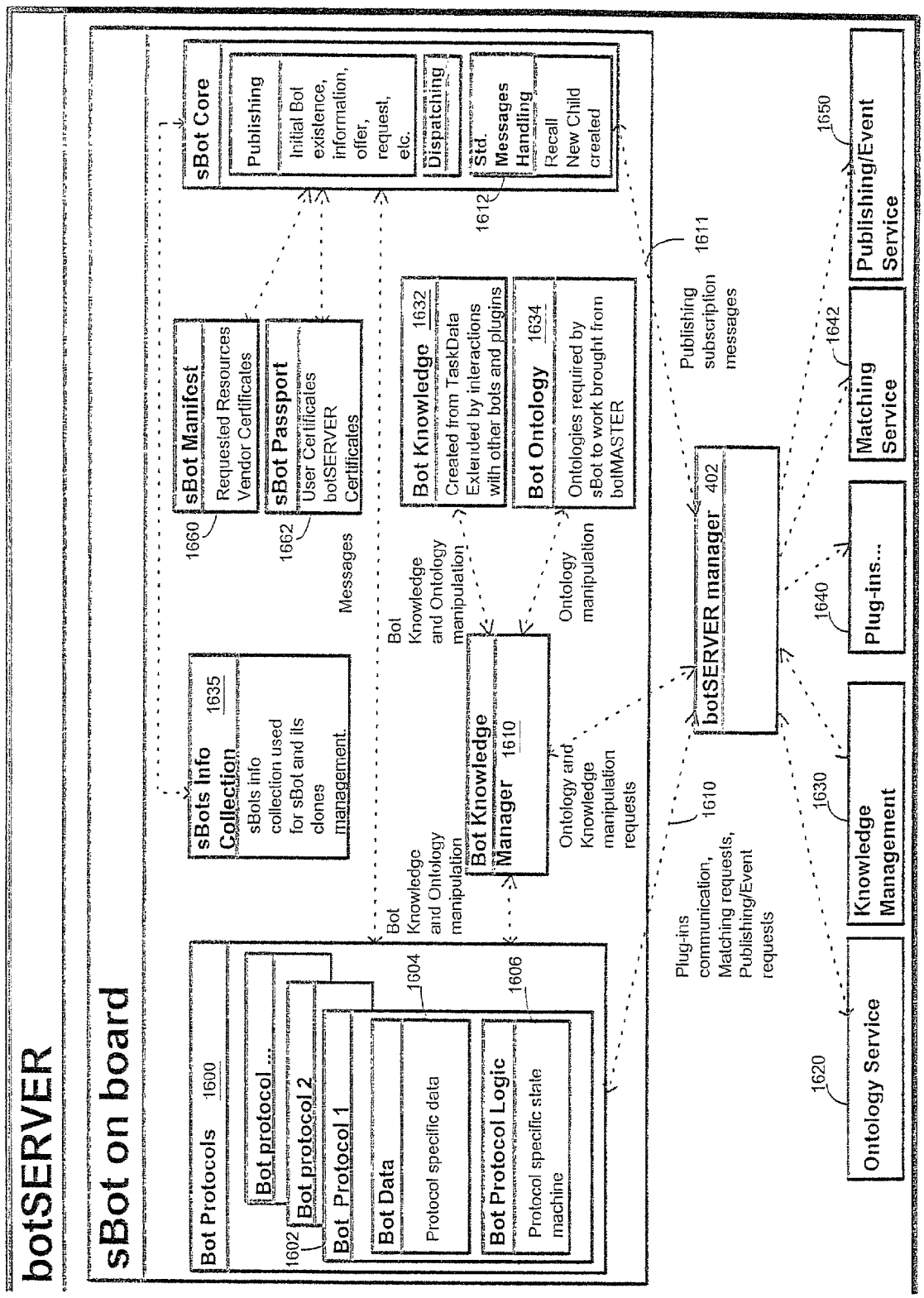
FIG. 16 is a software model showing the principal objects and messages of an illustrative sBot architecture.

FIG. 16 illustrates the software architecture of a representative sBot in somewhat greater detail and in the context of its interactions with the botServer host. The sBot architecture includes bot Protocol Component 1600. One or more protocols can be coded into the sBot. Each protocol, for example bot protocol 1602, can include protocol-specific data 1604, if necessary, and also implements the specific protocol state machine 1606.

The sBot activities are managed by the sBot Core 1612 which includes provisions to implement publishing, dispatching and message handling. The publishing component publishes existence and aims of the sBot, if appropriate, to allow other bots to contact it—for example, to commence a conversation or negotiation. The bot might use the publishing component also to publish multiple independent information, offers etc., query for them and register persistent interest in some type of information. The publishing component can send publishing subscription messages 1611 to the botServer Manager 402 to register or publish information described above in the botServer publishing component 1622. The botServer preferably also provides an event notification service 1624, which provides event-notification messages via botServer Manager 1620 to the bot via a message path 1626. Generally notification messages will be processed by protocol logic. Additionally, the bot doesn't need to be executing to receive the event messages—they can simply be stored in the bot's message queue. Message path 1626 also accommodates plug-in communications, matching requests and publishing/event requests initiated by the bot protocol logic. The message-handling component of the sBot core handles correspondence with child sbots, as well as the sibling mBot (via botbox).

The sBot Knowledge Manager 1610 manages manipulation and deployment of bot Knowledge 1632 and bot Ontology 1634. Bot Knowledge 1632 can be provided from the botbox, created from task data, and/or extended by interactions with other bots and plug-ins. The bot Ontology 1634 appropriate to this particular sBot's tasks can be provided from botMaster. Note that the sBot Knowledge Manager 1610 is distinct from the botServer knowledge management component 1630, as well as the mBot Knowledge Manager (1520 in FIG. 15) and botMaster Knowledge Manager 590.

An sBot's information collection 1635 manages information on all the sBots' siblings including mBot(s), sBot clones, other bots launched by this bot etc. It may be used for notification purposes, and bot "garbage collection"—clean-up after bot termination etc.

The sBot also includes an sBot Manifest 1660 which can include vendor certificates—for example, digital signature provided by the sBot developer, as noted before. An sBot Passport component 1662 can be used to carry user certificates and botServer certificates necessary for the sBot to acquire necessary resources. For example, an appropriate botServer certificate may be required for the sBot to migrate to a new server. The passport is effectively carried by the sBot. It is initially created on the server on which the bot is first created, and may be extended during bot migration. In a presently preferred embodiment, the bot passport contains a global identifier, date of birth, digital certificates of the user, and servers that the bot has visited, with signatures over code, over instance parameter data and over the whole passport. Importantly, the bot passport contains the allowance rights for the server and other proprietary permission-attributes (tickets, permits, roles). User certificates may be necessary to access various secure resources. User certificates may require particular user data before they can be used.

8. MBot Architecture.

Figure 7:
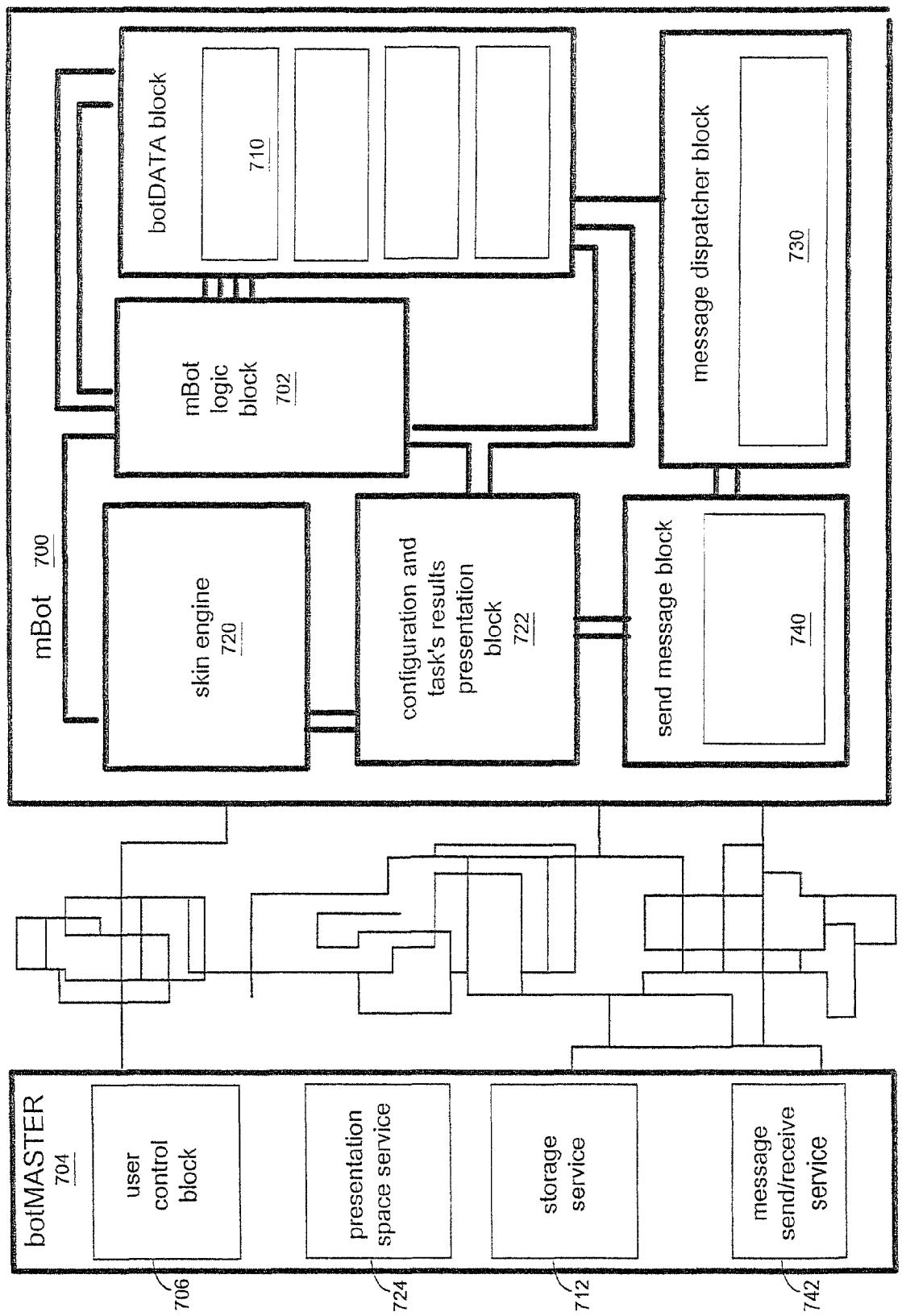
FIG. 7 is a functional block diagram of an illustrative mBot architecture.

FIG. 7 provides a simplified, general overview of an mBot architecture. The mBot is also an executable application program, designed to interact with one or more related sBot siblings, although in most cases interactions will take place via the botBox intermediary. (For some applications, such as those requiring near real time results, direct communication between mBot and sBot can be effected using known technologies and protocols.) An mBot architecture is centered around an mBot logic block in a configuration similar to that of the sBot architecture of FIG. 6. An mBot 700 is, of course, hosted by a botMaster application 704. A user control block 706 of the botMaster (coupled to the GUI of FIG. 5) allows the user to show or hide the mBot "skin." The user control block communicates with a skin engine 720. The user can invoke a predetermined configuration for the presentation interface, again via the user control block, utilizing a "configuration and task results presentation block" 722. The mBot displays messages, data and other results via the results presentation block 722, in communication with a botMaster presentation space service 724. The mBot utilizes a bot data storage block 710 for storing all necessary data, under control of an mBot logic block 702. The mBot automatically stores and loads its data in the botMaster data store, utilizing a botMaster storage service 712.

The configuration block 722 can be used for selecting or configuring a required logical function to be carried out by the logic block 702. For example, the configuration block 722 can receive parameters from the user control block, incorporate them and provide them in a call to the logic block 702. The mBot can also send messages to the sBot by utilizing a send-message block 740. All messages originating in the send-message block are transmitted to the sBot via a botMaster's message service 742. BotMaster messaging services were described earlier with reference to FIG. 5. Conversely, all messages received from the sBot (via the botMaster message service) are directed to a message dispatcher block 730 in the mBot for routing or delivery as appropriate. For example, some messages will be routed to the logic block while others might invoke methods in a dispatcher block 730, for example, to store data in the data block 710 directly.

The described architecture provides an infrastructure for implementing any desired type of intelligent agent functionality. A specific business logic preferably is implemented for the most part in the sBot, while the mBot is concerned largely with user interface, configuration and messaging operations. This philosophy reduces the communication bandwidth requirements from botMaster and the loading on the client platform. Using this paradigm, even a relatively low-powered computing platform, such as a PDA, could be used to dispatch and manage even thousands of bots since the botMaster need only store and process a very limited amount of data.

FIG. 15 is a simplified software model showing the principal objects and messages in another illustrative mBot architecture. MBot operations are directed by an mBot core 1500 which manages interaction with the user via the graphical user interface 1502, initial data manipulation, result data manipulation, and communications with the sibling sBot. All communications pass through the host botMaster (reference 1510 in this drawing). Each sBot is designed with one or more bot protocols to carry out a predetermined function. The mBot includes a protocol progress handler 1512, which is arranged to exchange protocol progress messages with the mBot core 1500. The mBot core receives these and other messages from the sibling sBot through the host botMaster botManager 1515. The mBot also includes an sBot information collection 1516 or it stores information about the sibling sBot, its clones, if any, and status. Current information of this type, as may be recalled, is maintained in the user's botBox.

FIG. 15 also illustrates an mBot manifest 1518, which is provided by the mBot source (such as a third-party developer) in association with a particular bot. The mBot manifest includes digital certificates to establish validity and authenticity, author information, security permissions, etc. The botManager 1515 can use this information in managing the mBots under its jurisdiction. The mBot further includes a bot Knowledge Manager component 1520—not to be confused with the botMaster Knowledge Manager (590 in FIG. 5). The botMaster Knowledge Manager, it may be recalled, develops a user model and various user profiles which may be used with one or more individual mBots as designated by the user. In the individual mBot of FIG. 15, the bot Knowledge Manager 1520 manages knowledge specific to that mBot. This includes acquisition and manipulation of bot ontology 1522 as may be required by the sibling sBot. The bot Knowledge Manager 1520 also stores and updates knowledge data which is maintained in the mBot data component 1526. The bot Knowledge Manager 1520 can also manipulate bot Knowledge 1530 acquired from the botMaster.

The mBot architecture FIG. 15 also includes a task data component 1540 for storage and manipulation of data specific to this individual mBot's task. As indicated in the figure by message paths 1542, the mBot communicates with bot storage 1550 provided by botMaster. So, for example, where the mBot has to store and/or manipulate knowledge information or task data, the botMaster host can provide additional resources. In operation, the mBot core 1500 communicates with the sBot, in part to collect task data 1540. The mBot core may manipulate result data received from the sBot. The bot Knowledge Manager 1520 oversees knowledge querying of that data, message path 1552, and applies an appropriate bot knowledge and ontology for analysis of that data and drawing conclusions.

The knowledge management operations can be briefly summarized as follows. The host botMaster develops knowledge of the user, namely, the user model and user profiles, which are maintained and managed on botMaster. The appropriate user knowledge necessary for a particular bot is acquired by the mBot from botManager, and that mBot makes that knowledge (and only that knowledge) available to the corresponding sBot(s) through the intermediary botBox that serves this particular user. The local mBot knowledge of the user can also be used for filtering and manipulating task result data received from the remote sBot.

9. Bot User Representation: User Profiles.

Currently, the bot systems do not take into account the complexity of the nature of human-bot interaction in terms of representation of the user in the bot system. Since many bots are designed to execute some actions on behalf of the human user, it is crucial for her to be able to choose the proper personal information that she wants to reveal to the world via her bots. This goal is realized by implementing multiple user profiles in each of the user accounts (botBox) in bot systems and allowing the bots to interact with her via those profiles.

Another feature of the new architecture described here is a new approach to user anonymity and identification in the bot systems. It covers also filtering of the information provided to the user by the external parties (mostly bots) based on the filters applied to the user profiles (anti-spam) and dynamically created user profiles supporting both the anti-spam features and anonymity.

Each bot user (individual or corporate) that has an account in a bot system may define multiple user profiles linked to this account. Each of those profiles defines various user data that may be exposed to the outside world, e.g., by bots. The user defines (manually or by some automation, scripts, etc.) which data should be present in the particular profile and which should not. Additionally, the user may choose to define some security on the data in the profiles that allows access (or various types, like read, write, query, change permission, etc.) to the user data segments to the particular instances of objects (bots, humans, processes, etc.). (Access control list mechanism is an example.) The security on the user profile is optional and independent of the data distribution among the multiple profiles.

The profiles may optionally share some data (in order to be able to change them in one place and gain an auto-distribution among the profiles), but generally the data are independent both in scope and values. Example: one profile may present the user as an elderly male with green eyes interested in jazz while the second may present the same user as the young female with green eyes (and no data on hobbies).

Each user profile has a unique identifier that distinguishes it from other profiles. Each profile has knowledge of the user account and the user account has knowledge of the profiles linked to it. This allows two-way communication between the user and the bots operating on the particular user profile. The user profiles however do not reveal the user account details to the external parties (e.g., foreign bots). This assures that no one is able to gain the knowledge of the user having access to the particular user profile (unless that information is explicitly provided in the given user profile). Each user profile acts as the receiver and dispatcher of the messages coming from and to the user. Each bot has knowledge of at least one (and usually only one) user profile but should not have to have any knowledge of the user account (the particular system implementation might relax this rule if they assure that no user information present in the user account itself is passed to unauthorized parties). During work (negotiations, sending, etc.) with a particular bot, the user may choose the profile(s) he or she wants to use (thus choosing the "personality" he or she wants to be identified as). Since the bots have knowledge of only the particular profile(s) having access only to the data that it (they) contain, the user may choose the exact amount of information on him or herself he or she wants to expose (regardless it is true or false, complete or fragmental, etc.).

The user may choose to create the dynamically created, temporary profiles based on existing ones. The temporary profile is used for a limited amount of time (specified by timeout, response type, or any other kind of trigger) or per-transaction and after that it is destroyed. This allows the user to block all the later communication attempts (especially spam) with a particular profile—they will fail because the profile does not exist anymore. It also supports the anonymity in the bot system—it is difficult (if possible at all) to track a person using the dynamic profile. The user may also choose to define the information filters on each user profile. Any information flow going through the profile may be analyzed (e.g., checking the sender, analyzing the message content, etc.) and rejected if does not fit to the rules defined in the filter. This allows an additional anti-spam mechanism to be built into the user profiles. The rejected information is not routed to (and from) the user account (optionally only notifying it about the information rejection).

10. Bot Waiting and Discovery Services.

Bot execution is, generally, event-driven and they are not allowed to possess e.g., a thread that constantly does something. Instead, their activities are defined as a series of steps, each of them being triggered by arrival of some external event. After handling them bot surrenders the control to bot operating system (platform). This implies that bot usually waits for some event to occur and eventually handles the event when it occurs. To be able to handle particular, chosen events, a bot first subscribes for them in publishing service, which is responsible for routing events to all bots that have subscribed for them. Messages sent directly to bot are also treated in the same manner—like an event.

Bot subscribes for chosen events in a publishing service. One common example is time events (e.g., "time equals 12.00 pm"). A publishing service stores id of the subscribing bot and an event filter (for event selection). This element is illustrated as the Event Service 470 in the botServer architecture of FIG. 4. After registering (or subscribing), the Bot can go into an inactive state. BotServer is free to serialize the bot etc. to allow better load balancing and concurrency control. Next assume that the specified event occurs or arrives into the publishing service—the event service. The event service selects all bots that subscribed for this event, and routes event messages to the bots, by placing a copy in each bot's incoming message queue, which may be maintained by the bots Executor 420. The server wakes-up the subject bot (de-serializing it if necessary), and the server passes control to the bot, say 428, providing it with the incoming message queue. The bot handles all incoming messages, firing some events if necessary or sending messages to other bots. Then the bot process waits for another prescribed event. The foregoing describes a local event service 470. Bots also can subscribe through a plug-in for remote event notification and publishing services, component 1650 in FIGS. 4 and 9.

Discovery is an activity performed by all bots that need to be at least minimally elastic and adaptable to the changing execution environment. Some bots may not need discovery at all but most of them will use it. Discovery applies primarily to plug-ins, other bots, meeting places, system services and other botServer capabilities. Using discovery, bot is able to query and choose the potentially best parties to communicate with in order to fulfill the bot's business goal, verify if party has necessary capabilities, or e.g., choose the appropriate server to which to migrate.

Discovery within the botServer is supported by several different mechanisms such as plug-in discovery, meeting place querying, bot negotiation mechanisms and discovery protocols etc. Most of them may be wrapped by the matching service described in next paragraph. Publication of services and discovery of services provided by other botServers can be implemented utilizing the emerging industry standard UDDI protocol.

UDDI discovery proceeds as follows. First, the Bot queries for list of known botServers providing a particular service by sending a message. The Bot relinquishes control and waits for an asynchronous answer. The UDDI discovery service (server) receives the message, parses it, and retrieves the requested service description. UDDI discovery service then sends the bot a message with a list of servers (with descriptions) that meet it's needs. The bot is activated and handles the response. The bot analyzes the received information and performs some actions, a likely example being a request to migrate to one of the listed servers. General communications (such as discovery) can be handled by a botServer Communicator component 548 on botMaster.

11. Meeting Places and Interaction Protocols

A meeting place in the present system is a separated logical area of the botServer, where bots can interact with chosen types of other bots and plug-ins according to defined interaction protocols. Interaction protocols define a set of states that a bot may exist in, rules of transition from one state to another and [optionally] a description of the structure (schema) of documents (data) that can be exchanged between participating parties in order to transition from one state to another. An interaction protocol can be described, for example, in an XML-based language. The selected protocols are implemented on bot's and plug-ins in accordance with the present invention.

A bot developer kit (SDK) can be arranged to generate bot code to implement any of a selection of predetermined protocols. For example, a set of business function protocols can be built into the SDK to support rapid coding of bots to carry out those business functions. Through this implementation of protocols and standard data schema, interoperability of bots is enabled over a wide variety of practical applications. A Bot platform (botServer/botExecutor) participates in protocol execution in following ways: First, it verifies the protocol compatibility when a bot accesses the appropriate meeting place. Next, the platform traces the bots' and plug-ins' states and documents passed between them. It excludes from interaction those bots that do not conform to the agreed protocol.

Figure 13:
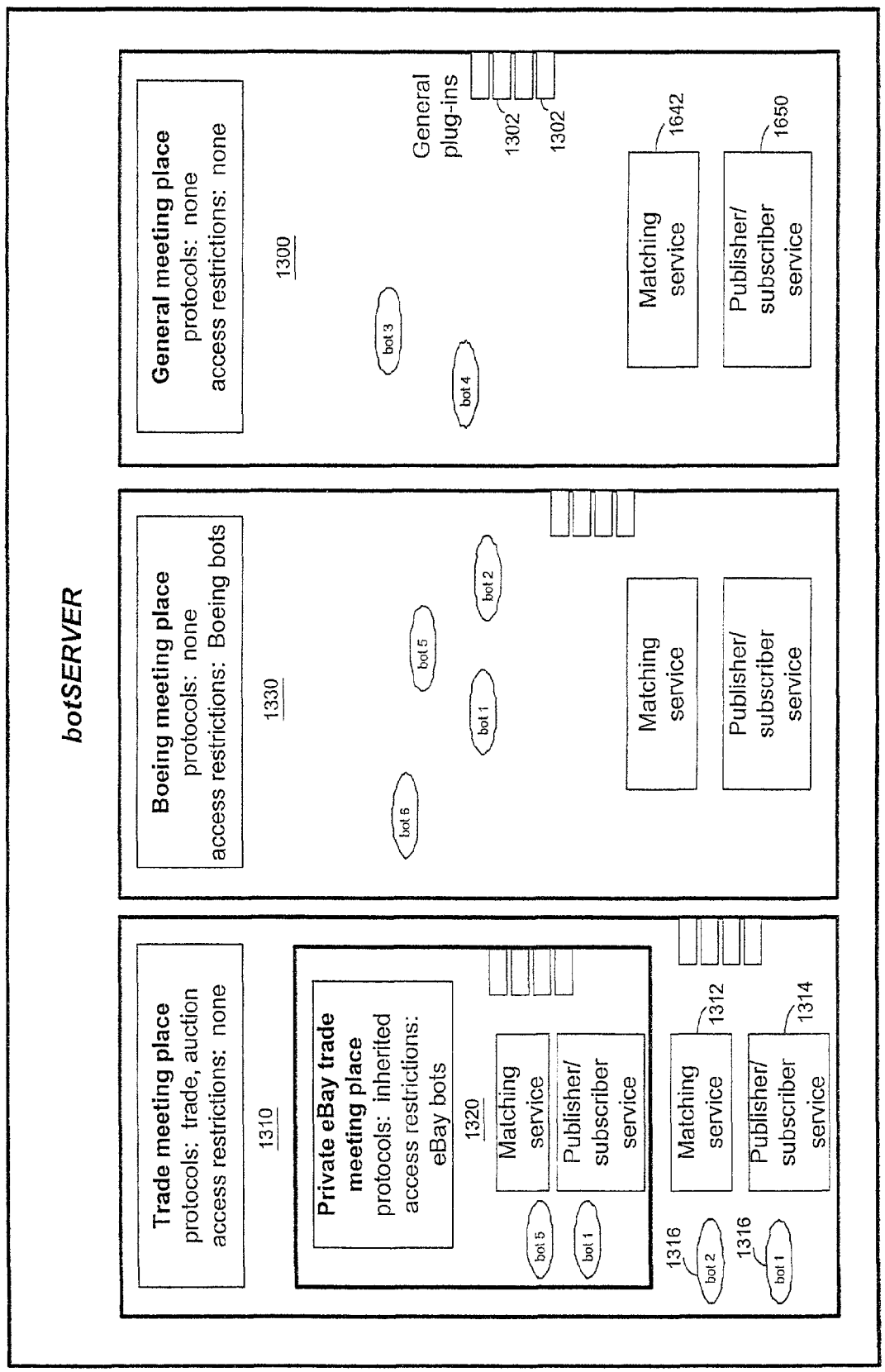
FIG. 13 illustrates virtual "meeting places" on a botServer platform.

The protocol/meeting place model allows logical grouping of bots that use the same protocol, thus reducing the flow of irrelevant information. A meeting place also can implement a "virtual proctor" to oversee bot interactions. Bots that violate the protocol may be excluded by the proctor (and perhaps relocate to a general meeting area). This arrangement makes protocol execution easier and safer, and bots within the meeting place are protected from spam. The meeting place also can be used as a convenient mechanism for restricting bots' access to some of the services or other bots. Meeting places are able to verify bots and determine whether or not to grant them access. And the meeting place paradigm enables flexible logical grouping of resources (plug-ins, publication groups etc.). Local publishing/subscription services can be provided, as illustrated in FIG. 13 (matching service 1312, publisher/subscriber service 1314, both in the trade meeting place). The meeting place can provide a convenient means of querying the available resources, bots and services. And it simplifies resource/policy administration; for example security privileges do not have to be set individually.

A discovery process can be used for a bot to locate a meeting place to interact with other bots. A discovery query for this purpose might include, for example, a protocol or scope of bot conversation allowed in such meeting places. The discovery service returns a list of meeting places that match the inquiring bot's requirements. To illustrate, FIG. 13 shows a botServer hosting several virtual meeting places, including a trade meeting place 1310, an individual corporate meeting place (Boeing) 1330 and a general (default) meeting place 1300. More specific trade meeting places, e.g. a "private eBay trade meeting place" 1320 can be arranged to inherit protocols from the general trade meeting place, and impose additional access restrictions (here eBay bots only are allowed). Meeting places thus can create a hierarchical tree in which each "child" meeting place inherits its "parent's" properties such as access rights, protocols, etc. except to the extent explicitly configured otherwise. Nested sub-meeting places may invoke more restrictive protocols or allow only bots of specific types or even individual ids. Bots may create their own private meeting places if necessary. In a presently preferred embodiment, meeting places would realize these characteristics: First, a given bot may participate in multiple meeting places at the same time. A bot is assigned to a particular meeting place on demand, except for the "general" meeting place where all bots are placed by default during bot's initialization. General meeting places have no special access rules, no defined protocols and thus there need be no supervisor or proctor on duty.

Once a bot has been admitted to the meeting place, it starts a "conversation" with another party (bot, plug-in, etc.) in accordance with the designated protocol. Bot constructs a data document to be sent to the other party. For example, the bot might construct an ACL message with the "performative" field describing the intent of the message (e.g. request for proposal) and attaches the data document to it. The bot sends the assembled message to the other party. The platform or meeting place verifies the message—the "performative" is verified to confirm that an allowed target state will be obtained and that the schema of the document sent (if schema is provided) complies with the designated protocol. The meeting place confirms the message acceptance. The sender bot changes it's state (e.g. to "waiting for proposal"), and then relinquishes control. Responses similarly are processed in the reverse direction. A meeting place can provide services for its bot guests, such as a matching service 1312 or a publishing/subscriber service 1314. General plug-ins 1302 can be available to access other services, local or remote. Initially, a Bot selects interesting meeting places (optionally using a discovery service) and tries to access them. The selection can be based on various criteria including factors such as bandwidth and cost. A particular meeting place may require that the bot have certain credentials to gain admission. For example, the Boeing meeting place may be restricted to Boeing bots. Note that cloning can be used to effectively enable a bot to execute at multiple (even hundreds or thousands) meeting places if necessary. On the other hand, discovery services can enable the bot to focus on just a few very specific meeting places appropriate to its needs.

12. Additional Bot Operations

Matching is a general mechanism that enables selection of abstract "offers" that most closely match abstract "requests." The mechanism is abstract, because it does not define what the offer really is. The determination is based only on its description and applying sophisticated AI algorithms to actually perform matching, however XML-based, "hard"—regular expression or SQL-like based, matching might be used as well (whichever more useful in a given situation). Such an approach allows, e.g., selecting botServers providing most appropriate services, or selecting trade offers closest to the buyer's requirements—all using the same mechanism. Generally the matching service should be able to provide a match of request and offer even if they cannot be matched by simple comparison.

To illustrate: request: "I want to buy an at least mid-size American automobile for less than $10,000," offer: "I want to sell a full-size US car for $8,500." A matching service can use an appropriate ontology and reasoning infrastructure to "understand" the meaning of offers and requests well enough to provide a best match (e.g. in the above example offers "match" even if one uses words "buy", "automobile" and "American" while the other uses "sell", "car" and "US," and obviously $8,500 is within the purchaser's range of "less than $10,000.") This scenario can take place in the trade meeting place 1310 of FIG. 13, where the purchaser bot, say bot 1316, subscribes to the matching service 1312 (see "Publication" below). While this patent does not address implementation of a matching engine, the architecture to support these kinds of activities is a primary feature of the present invention.

Figure 12:
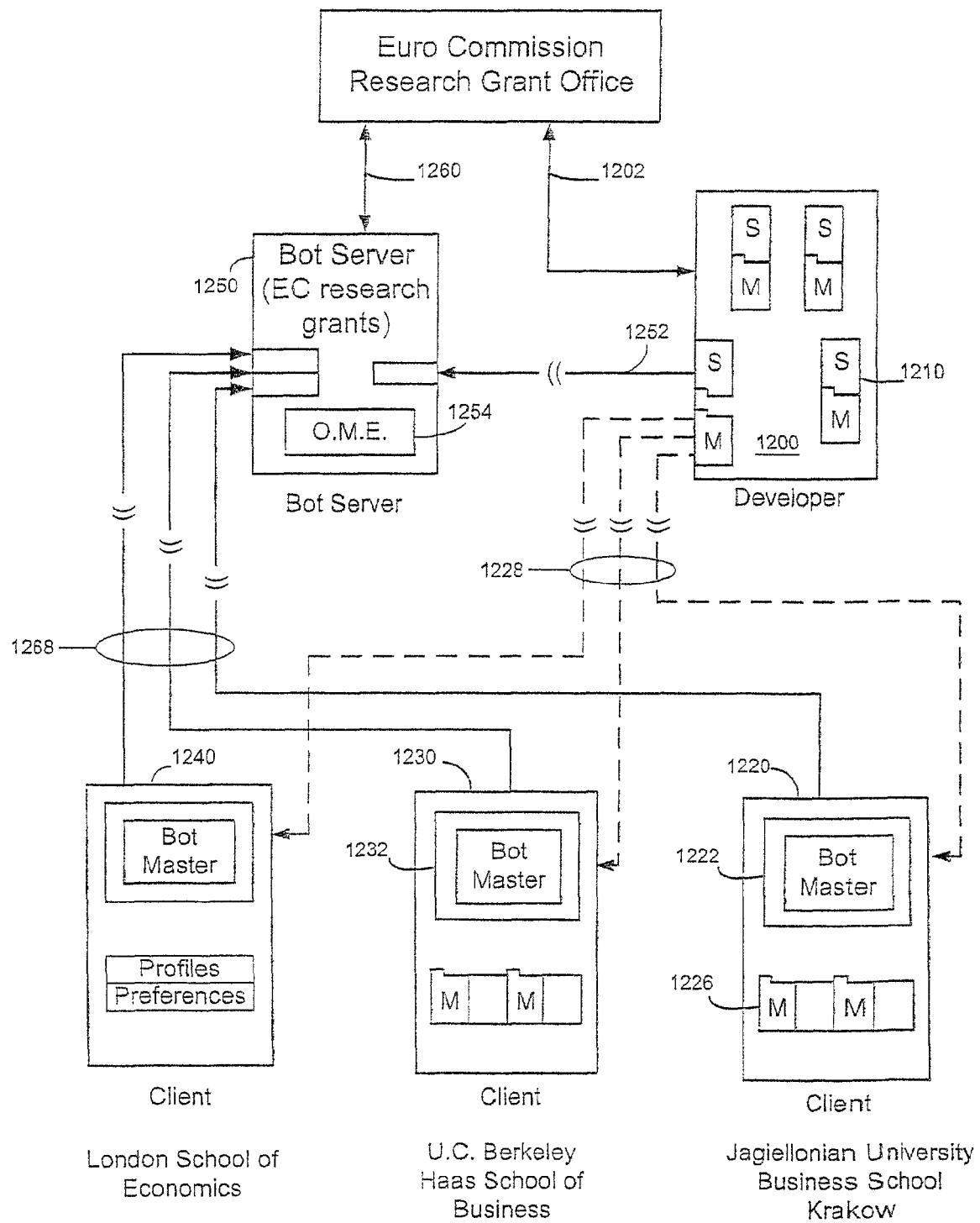
FIG. 12 is a simplified block diagram illustrating use of the present bot architecture as it might be applied to solicit and analyze research grant proposals.

Matching is not at all limited to these simple examples. FIG. 12 shows an application of a more sophisticated Ontology Matching Engine ("O.M.E.") 1230. There, the "purchaser" is the European Commission Research Grant Office, seeking qualified grant applicants. The OME matches qualifications and experience of applicant universities to the EC's requirements. (This application is discussed further below.) Thus in the present application the concept of an "offer" is used very broadly to refer to any defined interaction or transaction that a bot is can execute with another entity.

One example of the use of a publication service is illustrated in FIG. 17. FIG. 17 shows a first PC having a botMaster 1700 running in Outlook. PC1 is hosting bot1 which is "online," meaning the corresponding sBot is running on a botServer, in this example an auction botServer 1720. A second bot, bot2, is executing on PC2 in another botMaster 1710. Its sibling sBot is also executing on 1720. In the auction botServer 1720, bot2 is "watching" auction activity via the auction plugin. In B2B exchange botServer 1740, bot3 has subscribed with a matching service to receive notification of an offer that satisfies predetermined constraints, optionally within a set time limit. Bot2 may extend such an offer by registering it with the matching service, and the matching service will duly notify bot3.

Whenever any new offer is being registered in the matching service, it analyzes it to check if it matches any registered bot's requirements. If so, the matching service sends the bot a message with a list of matched entities. The Bot is activated and begins processing the list, initiating negotiations as appropriate with each of the found bots and plug-ins, perhaps seeking additional information if the quality of the match is marginal. Once its needs are met, the Bot withdraws it requirements entry from the matching service. Another bot hails from a "PocketPC" device 1730. This bot4 is executing on botServer 1740, a B2B Exchange front end. More specifically, bot4 is executing a purchase protocol that interacts with a B2B plug-in interface to the exchange.

FIG. 17 also shows another scenario in a web search botServer 1750 where the event service 1756 is shown explicitly. There, an sBot is shown running on the search botServer. A web search plugin provides web search results to the sBot. The sBot can register with the event service 1756 to receive an event notification 1752, for example based on time, in response to which the sBot requests the plugin to update the web search. Alternatively, the search plugin can provide an event message 1754 to the event service, for example when a given condition or search result occurs. The service notifies the sBot which has registered for that event. Thus either push or pull models (or both) are easily realized. The activated sBot can then process the search result data as discussed in connection with FIGS. 15 and 16.

Observation can be characterized as an activity class, however in most cases it can be realized as a subscription on either a matching service or in a publication service (depending on the class of processes/entities to be observed). Observing using a publishing (or event) service is based on a subscription for classes of events, e.g. "New bot arrived in the meeting place." Observation can be used to enable a bot to react to the offers that reach some pre-defined levels, e.g. "Price drops below $100." Depending on the bot's logic, this may be implemented via a publishing service (if offer document schemas are reasonably well-defined), or a matching service (for more fuzzy or not well-defined offers).

There are various types of searching. Matching and discovery scenarios have already been mentioned. Other types of searching focus on processing large amounts of data, usually in the Internet to obtain a list of data providers (e.g., web pages) that have content characterized by selected keywords and phrases. Various search engines are known. Consistent with the present invention, such access can be supported by specialized search engine plug-ins, such as the application illustrated in FIG. 17, mentioned above.

Many bot activities will require transfers of money (or equivalents)—both on the platform itself (e.g., botBox hosting fees, per-service payments/micro-payments, fees for resource utilization) and outside of it (e.g., paying for purchased goods or services). The architecture described above supports protocols to enable on-the-fly negotiations of the payment conditions between bots and plug-ins. Here is an illustrative scenario:

Assume a bot accesses a service that requires payment. The service provider (plug-in) ABC presents bot payment requirements (e.g., fee=10$, only Amex or Visa credit cards allowed with exp. date not shorter than 4 weeks, name, DOB, credit card number and billing address must be provided). Bot sends to its botBox a request for authorization of above payment for the service provider ABC. The user's botBox accesses a botWallet component 917 to verify payment conditions. The botWallet either authorizes payment automatically (if possible) or asks the user to confirm it. Various options can be implemented in the bot and/or in the User Profile assigned to it. For example, one user profile might allow discretionary spending up to a predetermined limit, while another permits no spending without authorization by the user.

In the latter case, the botWallet sends botMaster an authorization request. BotMaster asks the user to authorize payment if necessary, providing him/her with details of the proposed transaction. User authorizes payment, optionally filling in necessary missing data (e.g., credit card number). The botWallet component gathers all necessary data, encrypts them for service provider ABC and gives them to the requesting bot. The botWallet also stores the payment data to be able to provide user with billing. BotWallet sends bot the encrypted payment data, and the bot makes the payment by accessing the service to provide the requested payment data.

An sBot (generally not mBot) can be configured to provide for cloning and/or migration to a new server. Cloning and migration are both special cases of the same general schema; i.e., a bot first asks the platform to multiply the bot on a chosen server, say 920 or 930 in FIG. 9, recreating its current state. Then, to realize migration 928, after successful creation of a bot on the remote platform 930, the original instance 922 destroys itself. For cloning, the new bot instance 932 lives concurrently on the same platform 930 as the original instance. The new sBot (or the old one) can further migrate 948 to yet another server platform. As described earlier, the user's botBox maintains a record of the existing bots; their current locations, progeny, status, etc.

In general, the platform provides bots with a basic mechanism of implementing synchronization—new bots are provided with identity of their "parent" bot instance, and botBox traces the parent/child bot relations to allow some "garbage collection" on user's demand. The cloning process proceeds as follows. The executing sBot sends its botBox (via profile) a request for copy creation along with its serialized state. It provides the name of a botServer on which the requested copy is to be created. The botBox verifies the requests (e.g., checking server migration policies or asking the server if it is going to accept the bot creation request). If acceptable, botBox sends the server requests for bot creation along with bots data. The selected botServer instantiates the bot (downloading sBot code if necessary) and initializes it with the data provided by botBox and the parent information. Then the server sends botBox confirmation of the sBot copy creation. The botBox stores the bot child information and notifies the parent of the successful copy creation. For migration (as distinguished from cloning), the original sBot then sends botBox a request for bot's self-destruction.

The reader will appreciate that the botBox feature of the present architecture readily enables communications among related bots, including, for example, multicasting messages to all children of a given parent sBot. BotBox also supports bot management from a variety of botMaster implementations, including master-slave botMasters that share a common botBox. On the other hand, the botBox is isolated from direct bot access by the intermediate User Profile layer described earlier.

13. A Bot Example—EU Research Grant Proposal

FIG. 12 illustrates one application of the present invention as applied to the administration and the awarding of a research grant. In FIG. 12, we assume that the European Commission has a research grant office responsible for awarding research grants to appropriate applicants. To take advantage of mobile agent technologies, the European Commission research grant office (EC) contacts a bot Software Developer 1200 indicated by a Communication Path 1202 and conveys specifications to the developer for designing or customizing a mobile agent for a particular research project. The specification describes the nature of the research project, qualifications for proposed researchers, information to be included in an application for the grant, selection criteria, and the like. This information could be provided to the developer in conventional hard-copy form or in machine-readable metadata. The developer may translate some or all of it into metadata or into "knowledge" expressed within the framework of academic research ontology. The developer creates the bot 1210 which consists of two associated programs, mBot and sBot. These bots implement the logic necessary for a potential researcher or academic institution to apply for the subject research grant.

In this illustration, one of the interested applicants is the Jagiellonian University in Krakow, Poland. Accordingly, a client machine 1220 in Krakow is hosting a botMaster program—for example, running in a web browser 1222. The botMaster program downloads just the mBot portion 1226 via download path 1228 from the developer site 1200. A second interested researcher is the U.C. Berkeley Haas School of Business. A client machine 1230, presumably located in Berkeley, Calif., also is hosting a botMaster program, under the auspices of an Internet browser 1232. The botMaster also downloads a copy of the mBot 1226 from the developer site 1200. A third institution in our hypothetical, The London School of Economics, also downloads the mBot to its client machine 1240 running in London.

The botMaster program, for example, the one running in London, develops a user model that has knowledge about The London School of Economics. The research grant mBot interacts with the botMaster Knowledge Manager (see FIG. 5) on the London client platform 1240 to acquire information about the applicant as specified by the EC and implemented by the developer. This permits the mBot to assemble all of the information requested by the EC, potentially with little or no human interaction. For example, The London School of Economics user model can include a description of the various departments, the faculty members in each department, the publications and other qualifications of each faculty member, other research programs, etc. Similarly, the mBots running in Berkeley and in Krakow assemble the corresponding information for those schools. When the mBots have completed assembling the necessary information for the research grant, they send a message to a botServer 1250 operated by the EC for managing research grant proposals or responses to requests for proposals.

The EC botServer 1250 downloads and installs the sBot portion of the grant bot 1210 via communication link 1252. All of these communications can be conducted over the Internet. The sBot program includes the logic or protocols appropriate for manipulating, assembling, comparing and indeed "understanding" the information presented through the three mBot programs acting on behalf of the grant applicants. Only a single sBot is required in this case, although as a technical matter the botServer 1250 can create three instances of the sBot, each associated with a corresponding one of the subject mBots. The botServer 1250 implements an Ontology-Matching Engine 1254 to assist in understanding and comparing the information brought to the server. Ultimately, the results are communicated to the EC via 1260. The bot can be programmed to present various results to the EC ranging from, simply, the name of the winner of the grant to a very detailed presentation of the qualifications of the grant applicants. The botMaster Communications 1268 with the botServer can be implemented through the botBox intermediary, as described previously, although security is of lesser concern in this example.

It will be obvious to those having skill in the art that many changes may be made to the details of the above-described embodiment of this invention without departing from the underlying principles thereof. The scope of the present invention should, therefore, be determined only by the following claims.

The invention claimed is:

1. A computer system comprising:
   a. a first server platform executing at least one processor for operating a botserver computer program;
   b. a botserver core software component operating a botserver, said botserver core software component comprising a botExecutor component configured to generate an sBot;
   c. a botExecutor component synchronizing a Bot system under direction of said botserver core software component;
   d. a bot software component bifurcated into two parts, said bot software component comprising:
      a first software component [mBot] executing on a local client platform and interoperating with a local client botMaster comprising an ontology encoded user profile;
      a second software component [sBot] associated with the first software component [mBot] of said bot software component;
      wherein said second software component [sBot] self-executing on said first server platform remote from said client platform and operating an sBot Knowledge Manager comprising a bot Ontology encoded user profile;

wherein said self-executing sBot interoperating with: said first software component [mBot], a network, a plurality of 3rd party sBots, and a third [botBox] software component for execution on said first server platform;

wherein said botBox providing a means of communication between said local client botMaster and said sBot;

e. a communication component for providing communications between the core component and at least one external program; and f. the botExecutor includes means for instantiating a specified sBot from a corresponding sBot class stored in an sBot repository responsive to a loading message from the botserver core.

2. The computer system according to claim 1 and further comprising an event registry service available to provide event services to an executing sBot.

3. The computer system according to claim 2 including means for directing the botExecutor component to activate a specified idle sBot in response to an occurrence of a selected event previously entered in the event registry.

4. The computer system according to claim 2 wherein the event registry implements a predetermined priority scheme applicable when more than one sBot registers for the same event.

5. The computer system according to claim 1 wherein the botExecutor implements a container for safe execution of an sBot.

6. The computer system according to claim 5 wherein the botExecutor implements an interaction controller for limiting interactions among two sBots executing in the container.

7. The computer system according to claim 5 wherein the botExecutor implements a resource controller for controlling allocation of computing resources to an sBot executing in the container.

8. The computer system according to claim 1 and further comprising the sBot repository for storing at least one sBot class code; and wherein the botExecutor maintaining an inventory of sBot classes stored in the sBot repository.

9. The computer system according to claim 8 and further comprising a bot verifier component to check the repository for the existence of executable code [sBot] corresponding to a launch request message received by the botExecutor.

10. The computer system according to claim 1 wherein the communication component includes a botBox communication means for exchanging messages with a botBox account realized on a remote server and associated with an sBot executing on the botServer.

11. The computer system according to claim 1 wherein the communication component includes a botMaster communication means for exchanging messages with a botMaster program that manages an mBot sibling associated with an sBot executing on the botServer.

12. The computer system according to claim 1 wherein the communication component includes a botServer communication means for exchanging messages with a second botServer program located on a second server platform thereby enabling coordination between sBot programs executing on the first and second server platforms.

13. The computer system according to claim 1 further comprising a plug-ins manager component for managing one or more software interfaces, each interface arranged for interacting with a resource external to the botServer; and wherein the core includes means for passing messages between the plug-ins manager and the botExecutor so as to afford an executing sBot access to the external resource via the corresponding interface.

14. The computer system according to claim 1 further comprising a code loader component for acquiring bot sBot code.

15. The computer system according to claim 1 further comprising a botBox manager component for creating and managing at least one botBox account associated with a remote user.

16. The computer system according to claim 15 wherein the botBox manager maintains at least one user profile associated with the botBox account on behalf of the remote user.

17. The computer system according to claim 15 wherein the botBox manager includes a process for implementing migration of an sBot.

18. The computer system according to claim 16 wherein the botBox manager maintains a plurality of predetermined user profiles associated with a given botBox account, and the botBox manager associates a designated one of the user profiles with a designated bot.

19. The computer system according to claim 1 further comprising a plug-ins manager to provide access to external services for an sBot executing on the botServer.

20. A computer system comprising:
a. a first server platform executing at least one processor for operating a botserver computer program;
b. a botserver core software component operating the botserver computer program, the botserver core software component [the core component] providing an event registry;
c. a botExecutor component synchronizing one or more bot software components partially under direction of the core component;
d. each of said bot software components bifurcated into two parts, said bot software components each comprising:
a first software component [mBot] executing on a local client platform and interoperating with a local client botMaster comprising an ontology encoded user profile;
a second software component [sBot] associated with the first software component [mBot] of said bot software components;
wherein said second software component [sBot] self-executing on said first server platform remote from said client platform and operating an sBot Knowledge Manager comprising a bot Ontology encoded user profile;
wherein said self-executing sBot interoperating with: said first software component [mBot], a network, a plurality of 3rd party sBots, and a third [botBox] software component for execution on said first server platform;
wherein said botBox providing a means of communication between said local client botMaster and said sBot;
e. the botExecutor implementing a container for safe execution of said sBot;
f. the core including means for directing the botExecutor component to notify a specified executing sBot in response to an occurrence of a selected event previously entered in the event registry;
g. the botserver further comprising an sBot repository for storing at least one sBot class code;
h. wherein the botExecutor maintains an inventory of sBot classes stored in the repository, and the botExecutor includes means for instantiating a specified sBot from a corresponding sBot class stored in the repository responsive to a loading message from the botserver core.

21. The computer system according to claim 20 wherein the botServer implements at least one general meeting place for execution of visiting sBots.

22. The computer system according to claim 20 wherein the botServer implements at least one specialized meeting place for execution of visiting sBots only in accordance with a first predetermined interaction protocol.

23. The computer system according to claim 22 wherein the botServer implements a child meeting place that inherits the interaction protocol of the said specialized meeting place.

24. The computer system according to claim 22 wherein the botServer implements at least one virtual proctor to oversee activities of sBots executing in the said specialized meeting place.

25. The computer system according to claim 22 wherein the specialized meeting place implements at least one local service.

26. The computer system according to claim 25 wherein the local service comprises a publisher/subscriber service.

27. The computer system according to claim 20 including a security registry.

28. The computer system according to claim 27 wherein the security registry includes at least one of a trusted user list and a not trusted user list.

29. The computer system according to claim 27 wherein the security registry includes at least one of a trusted developer list and a not trusted developer list.

* * * * *